(12) United States Patent
Kobayashi et al.

(10) Patent No.: US 9,351,496 B2
(45) Date of Patent: May 31, 2016

(54) PRODUCTION DEVICE AND PRODUCTION METHOD FOR LAYERED FOOD

(71) Applicant: KOBIRD CO., LTD., Fukui-shi (JP)

(72) Inventors: Masao Kobayashi, Fukui (JP); Hironori Kobayashi, Fukui (JP); Toru Fukiage, Fukui (JP)

(73) Assignee: KOBIRD CO., LTD., Fukui-shi (JP)

( * ) Notice: Subject to any disclaimer, the term of this patent is extended or adjusted under 35 U.S.C. 154(b) by 137 days.

(21) Appl. No.: 14/130,388

(22) PCT Filed: Nov. 25, 2013

(86) PCT No.: PCT/JP2013/082308
§ 371 (c)(1),
(2) Date: Dec. 31, 2013

(87) PCT Pub. No.: WO2015/004824
PCT Pub. Date: Jan. 15, 2015

(65) Prior Publication Data
US 2015/0132460 A1  May 14, 2015

(30) Foreign Application Priority Data
Jul. 8, 2013 (JP) .................................. 2013-142727

(51) Int. Cl.
*A47J 37/06* (2006.01)
*A21B 5/08* (2006.01)
(Continued)

(52) U.S. Cl.
CPC ... *A21B 5/02* (2013.01); *A21B 5/04* (2013.01); *A21D 8/06* (2013.01); *A21D 13/0045* (2013.01); *A21D 13/0067* (2013.01)

(58) Field of Classification Search
CPC .............. A21B 5/02; A21B 5/05; A21D 8/06; A21D 13/0045; A21D 13/0067
USPC ................... 99/349, 352–354, 386, 426–427, 99/431–433, 439, 450.1–450.2; 426/94, 426/275, 283, 391
See application file for complete search history.

(56) References Cited

U.S. PATENT DOCUMENTS 3,431,869 A * 3/1969 Barton .................. A21B 5/026
425/143
4,313,964 A * 2/1982 Dembecki ................ A21B 3/13
426/138

(Continued)

FOREIGN PATENT DOCUMENTS

JP    S57-033530 A    2/1982
JP    61-38454         11/1986

(Continued)

OTHER PUBLICATIONS

International Search Report mailed Feb. 25, 2014 issued in counterpart application No. PCT/JP2013/082308.

(Continued)

*Primary Examiner* — Dana Ross
*Assistant Examiner* — Lindsey C Teaters
(74) *Attorney, Agent, or Firm* — Kratz, Quintos & Hanson, LLP

(57) ABSTRACT

Provided are a production device and a production method for producing layered food having an outer shape and an inner hole shape formed into a shape different from a circular shape. A production device for layered food (1) includes: a dough supply section (3) for causing liquid dough to adhere to an outer circumference of a spit (12); a dough baking section (4) for baking the liquid dough to form baked dough (11) around the spit (12); conveyance means (5) for conveying the spit (12) between the dough supply section (3) and the dough baking section (4); a forming tool (70) including a forming surface (70A) conforming to a shape of at least a part of an outer shape of the spit (12); and drive means (71) for pressing the forming tool (70) against the baked dough (11) in the shape of the layer that is formed around the spit (12).

12 Claims, 40 Drawing Sheets
(3 of 40 Drawing Sheet(s) Filed in Color)

(51) Int. Cl.
*A22C 7/00* (2006.01)
*A23P 1/00* (2006.01)
*A47J 43/18* (2006.01)
*A21C 9/04* (2006.01)
*A21B 5/02* (2006.01)
*A21B 5/04* (2006.01)
*A21D 8/06* (2006.01)
*A21D 13/00* (2006.01)

(56) References Cited

U.S. PATENT DOCUMENTS

| | | | | |
|---|---|---|---|---|
| 4,795,652 A | * | 1/1989 | Cooper | A21B 5/06 426/138 |
| 5,032,413 A | * | 7/1991 | Haas | A21B 5/026 426/231 |
| 5,626,897 A | * | 5/1997 | Goldstein | A21B 5/026 426/138 |
| 8,349,384 B2 | * | 1/2013 | Huxel | A21B 5/026 425/346 |
| 8,877,279 B2 | * | 11/2014 | Emerson | A21C 11/08 426/501 |
| 2009/0304888 A1 | | 12/2009 | Mizuguchi et al. | |

FOREIGN PATENT DOCUMENTS

| | | |
|---|---|---|
| JP | 3005043 U | 9/1994 |
| JP | 3686671 B1 | 8/2005 |
| JP | 2008-237170 A1 | 10/2008 |
| JP | 2011-239718 | 12/2011 |

OTHER PUBLICATIONS

Supplementary European Search Report dated Dec. 4, 2015 for the corresponding EP patent application No. 13820708.9.

* cited by examiner

Fig.1
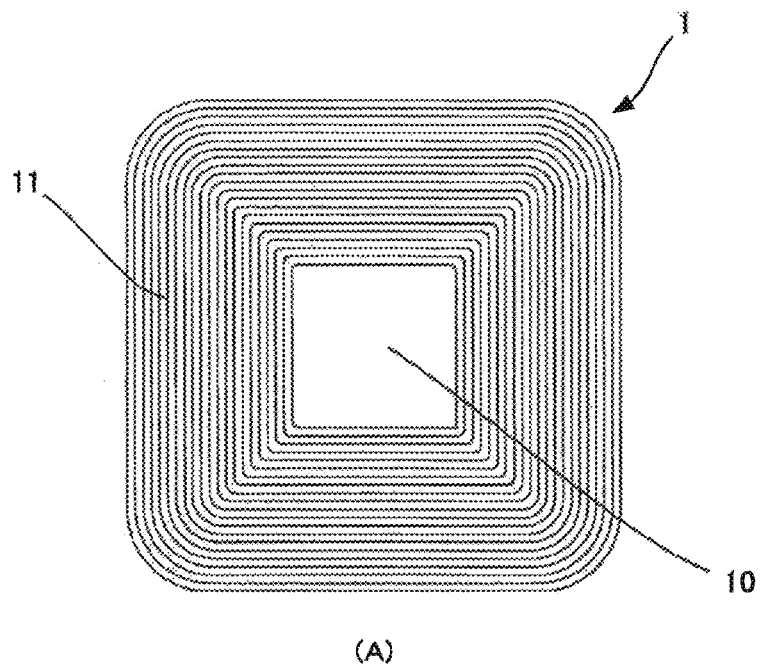
(A)
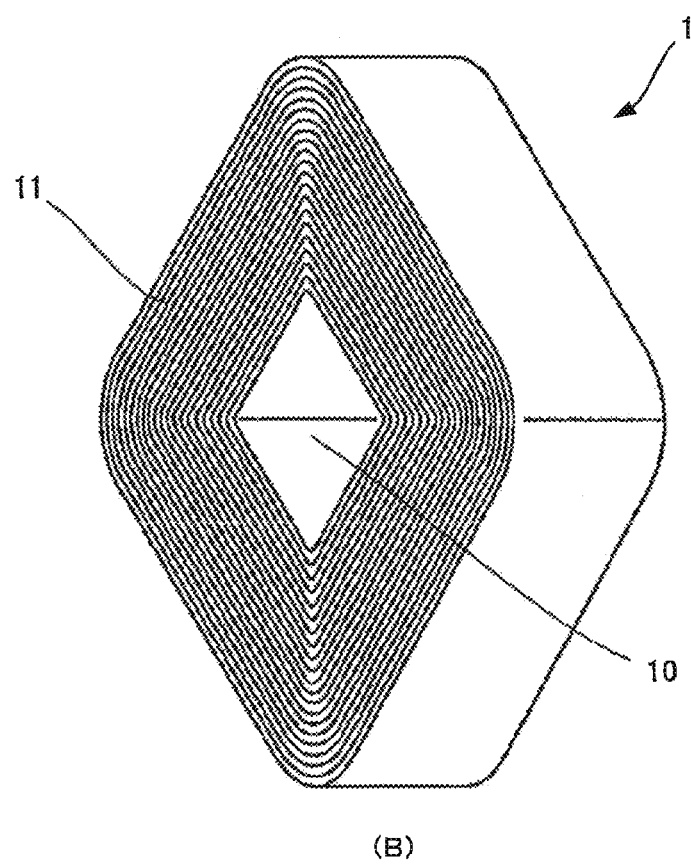
(B)

FIG. 2
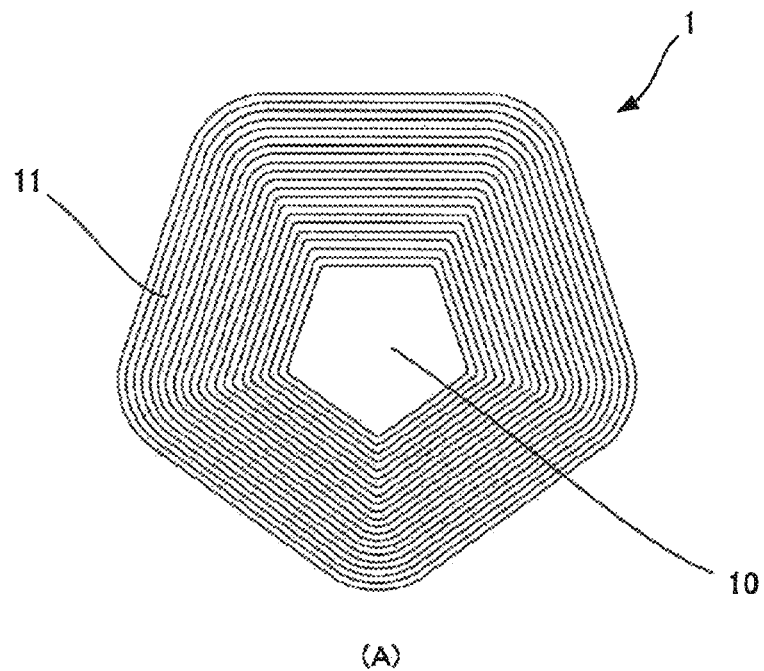
(A)
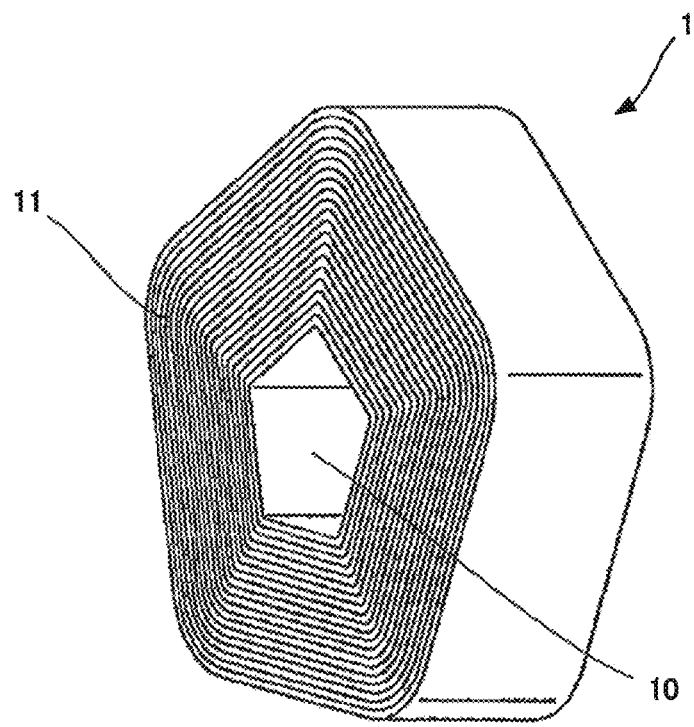
(B)

Fig.3
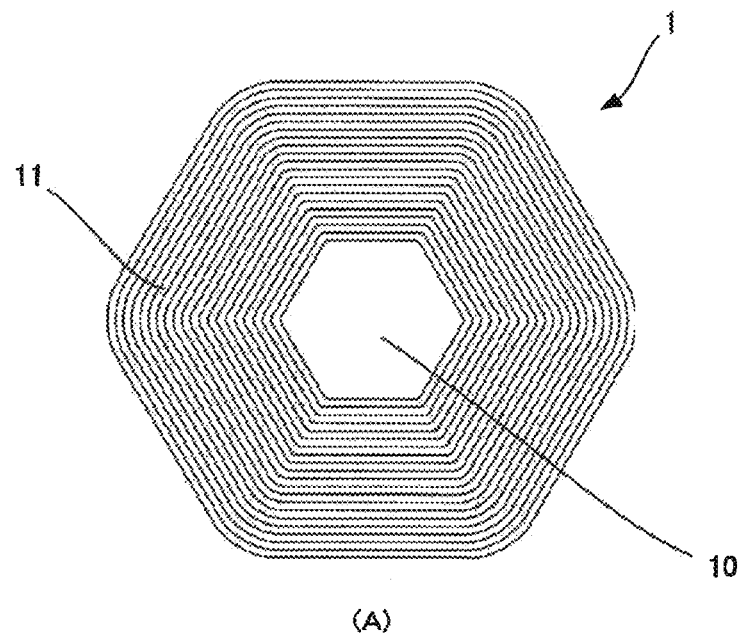
(A)
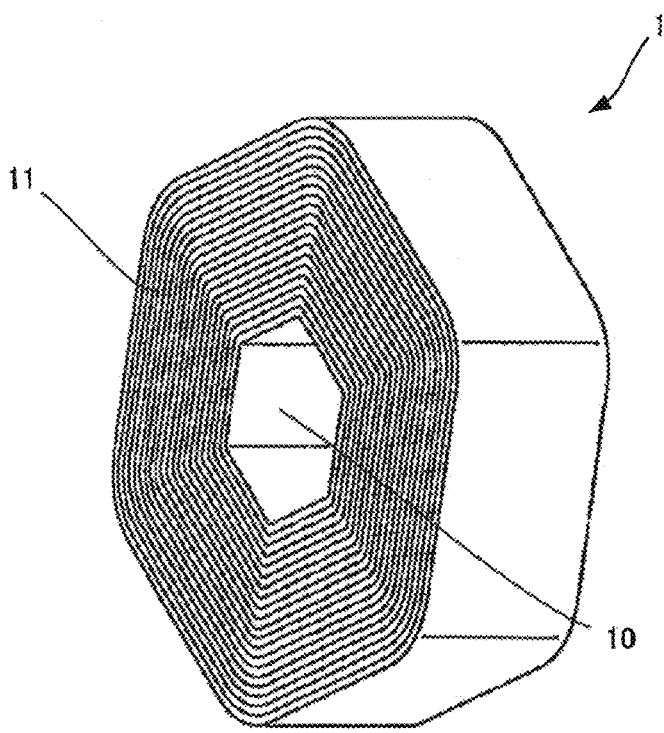
(B)

Fig.4
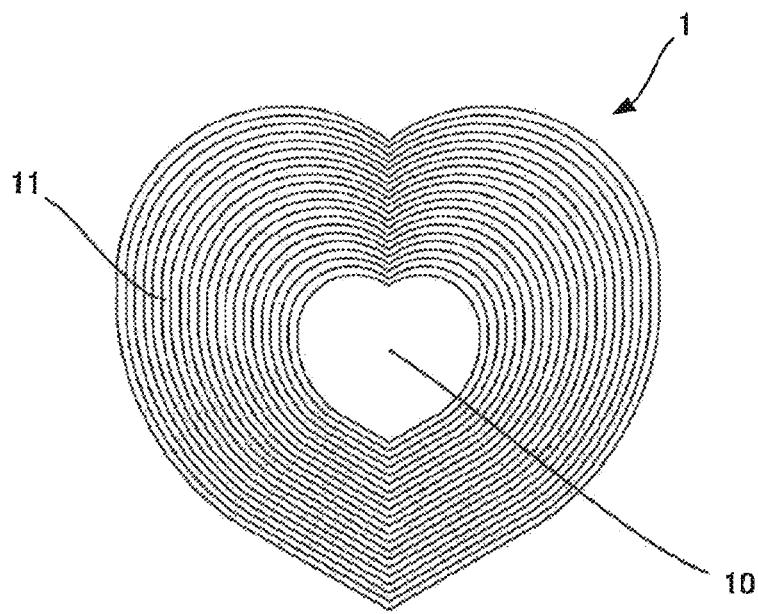
(A)
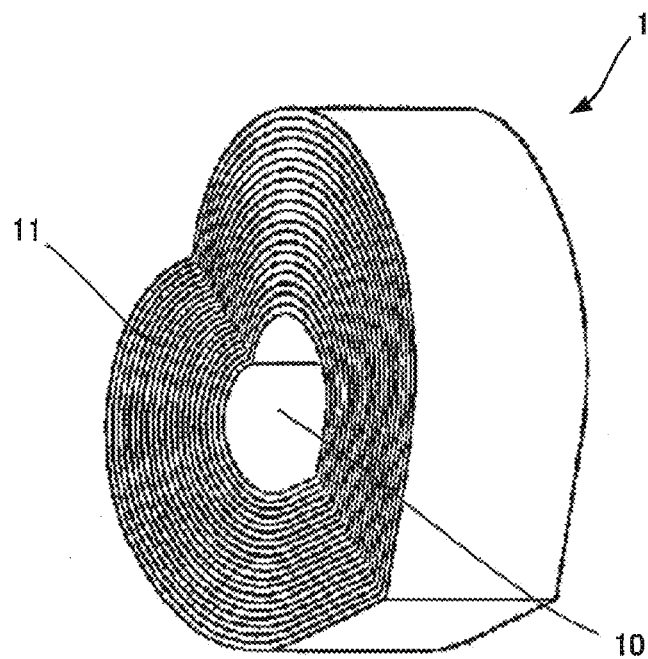
(B)

Fig.5
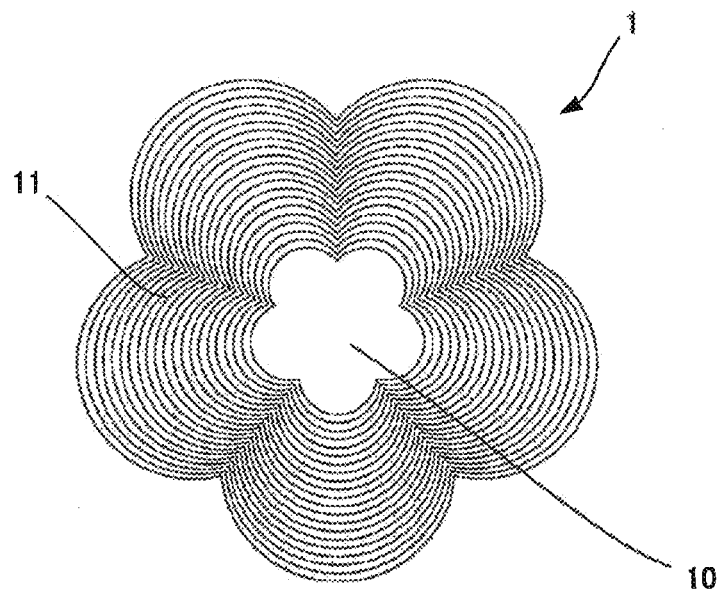
(A)
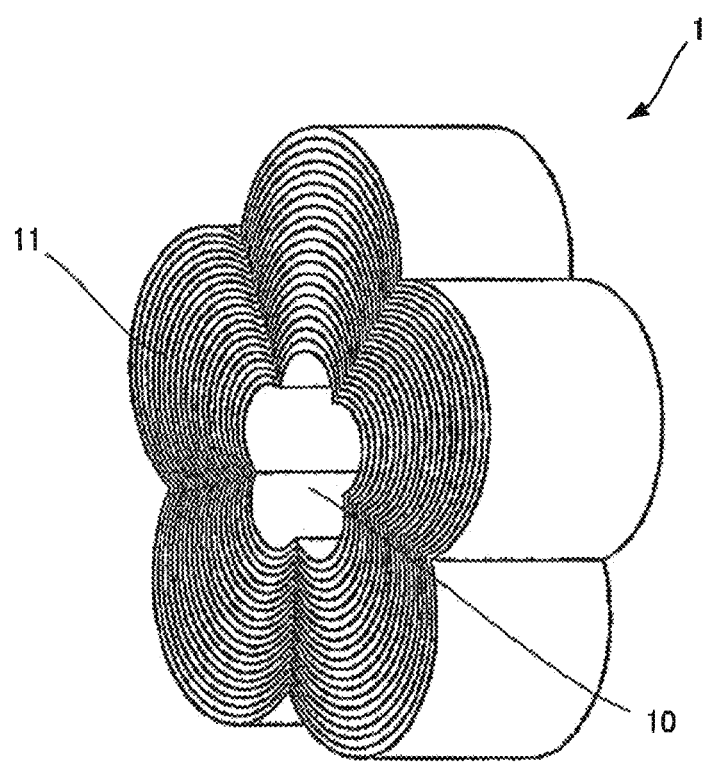
(B)

Fig.22
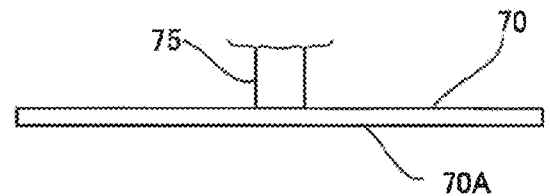
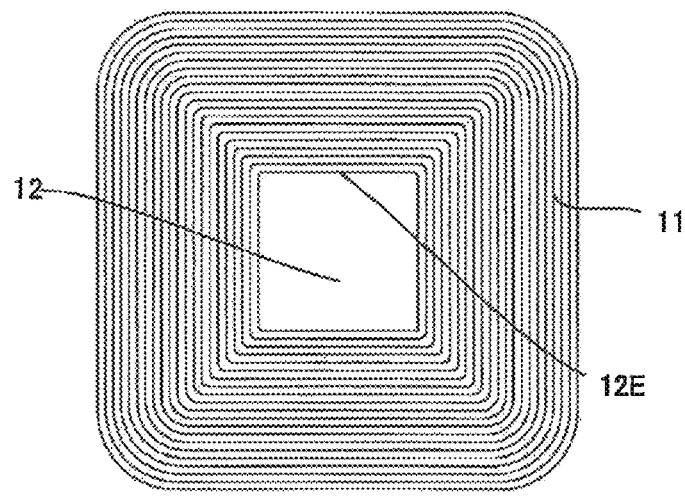
Fig.23
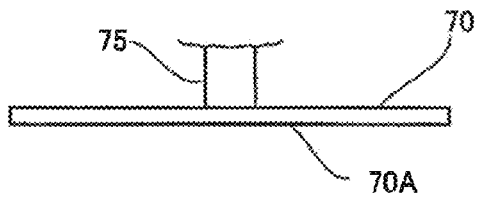
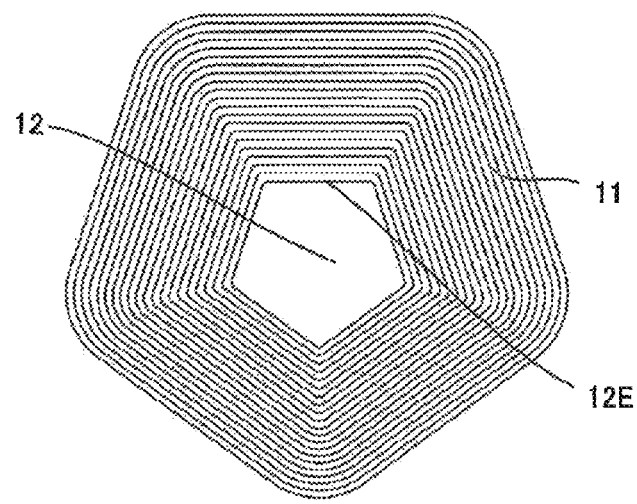

Fig.24
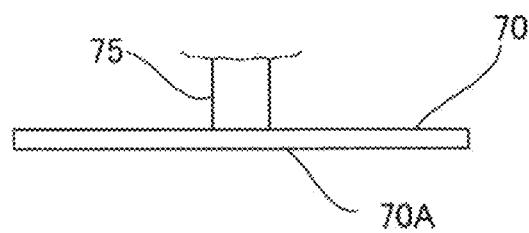
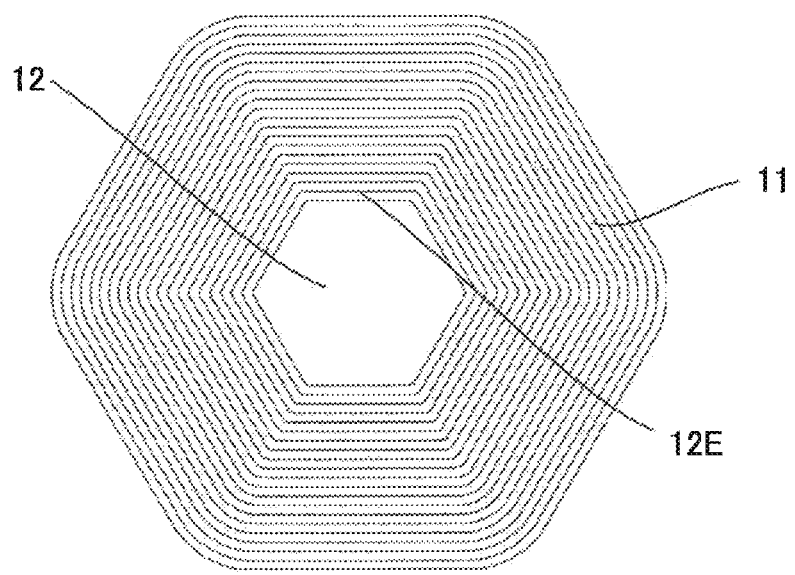

Fig.26
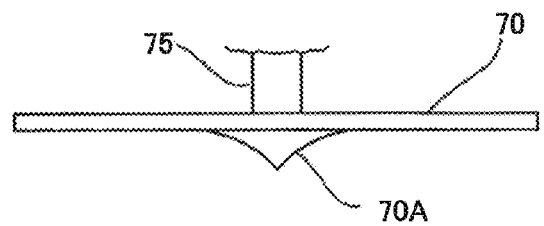
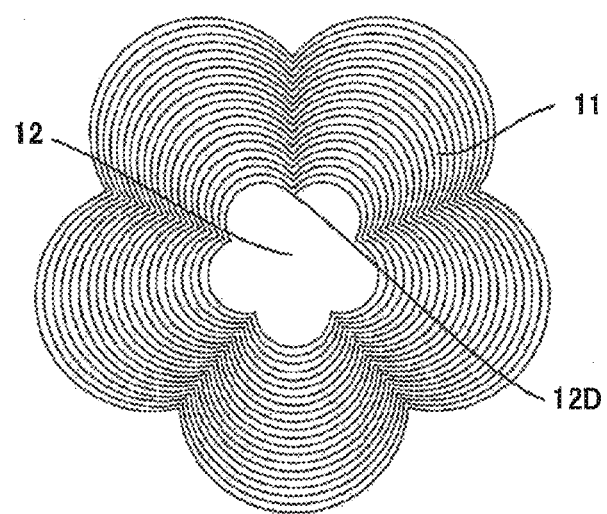
Fig.27
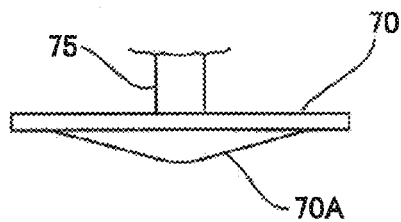
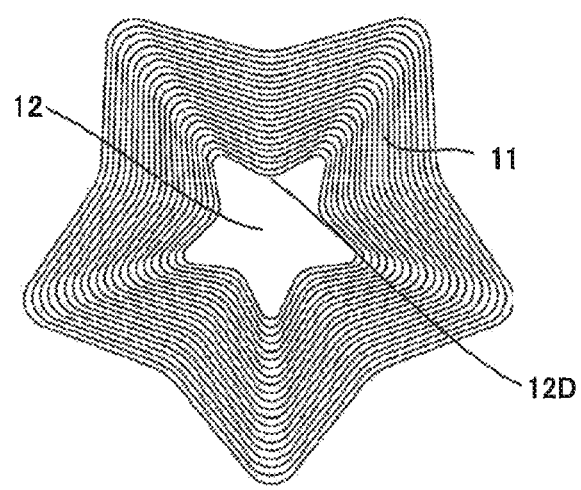

Fig.28
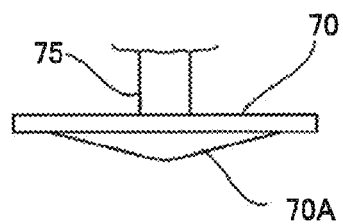
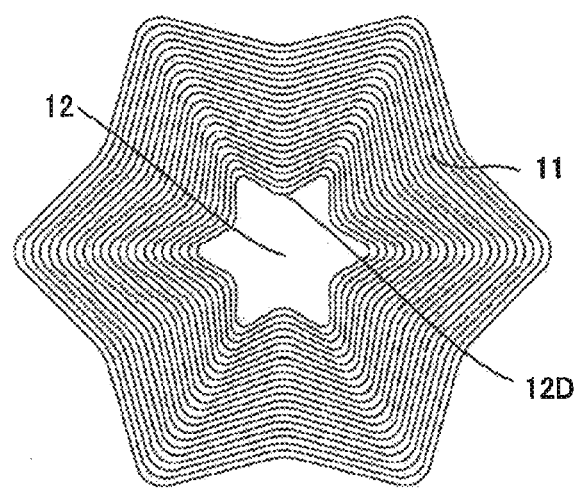
Fig.29
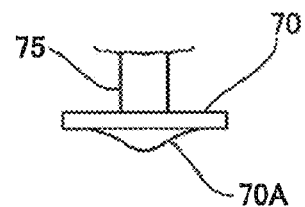
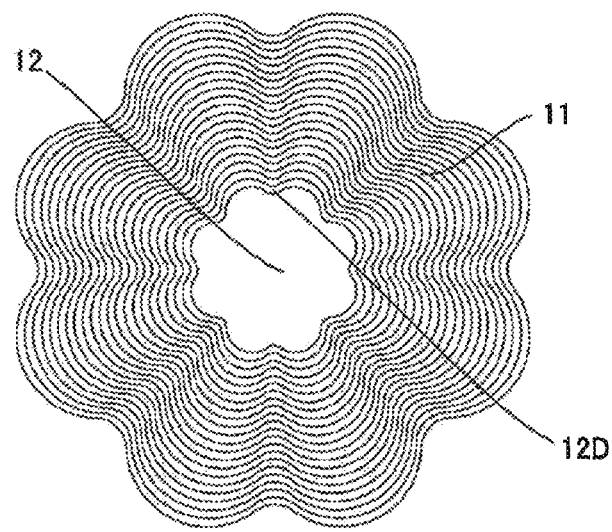

PRODUCTION DEVICE AND PRODUCTION METHOD FOR LAYERED FOOD

TECHNICAL FIELD

The present invention relates to a production device and a production method for layered food such as Baumkuchen.

BACKGROUND ART

Baumkuchen is a popular traditional baked cake having a hole at the center, which is produced by laminating baked dough around the hole several fold in the shape of tree rings. Hitherto, cylindrical Baumkuchen has been produced by repeating an operation of causing liquid dough to adhere to an outer circumference of a spit in the shape of a round bar, baking the liquid dough while rotating the spit in an oven equipped with a heating device such as a gas burner, then causing another layer of liquid dough to adhere onto the baked dough around the outer circumference of the spit, and baking the liquid dough in the oven again, thereby providing a plurality of pieces of baked dough around the spit in the shape of a layer.

Baumkuchen generally has a cylindrical shape in which an outer shape thereof is circular and an outer shape of an inner hole is also circular. There has been proposed a method of producing Baumkuchen having an external appearance with a shape different from a cylindrical shape (see, for example, Patent Literature 1).

CITATION LIST

Patent Literature

[PTL 1] Japanese Utility Model Registration No. 3005043

SUMMARY OF INVENTION

Technical Problem

In Patent Literature 1, a baked cake having a plurality of pieces of baked dough laminated around a heart-shaped baked cake is produced by repeating, for example, an operation of causing liquid dough to adhere to an outer circumference of another baked cake having a heart outer shape and then baking the liquid dough while rotating the baked dough.

However, the baked cake of Patent Literature 1 has an external appearance in a solid trunk shape although the inside thereof is filled with another heart-shaped baked cake, and hence has almost the same circular outer shape compared to that of traditional cylindrical Baumkuchen. Therefore, the external appearance of the baked cake of Patent Literature 1 is not so unique or unexpectable as to attract attention from consumers. Thus, the baked cake of Patent Literature 1 has weak impression on consumers, and there remains a problem in that it is necessary to arouse consumers' eagerness to buy the product.

The present invention has been achieved in view of the above-mentioned problem, and it is an object of the present invention to provide a production device and a production method for layered food having an external appearance full of uniqueness and unexpectedness by producing the layered food having an inner hole, such as Baumkuchen, into an outer shape and an inner hole shape different from a circular shape.

Solution to Problem

The above-mentioned object of the present invention is achieved by a production device for layered food to be produced by laminating a plurality of pieces of baked dough in a shape of a layer so as to surround an inner hole, the production device including: a dough supply section for causing liquid dough to adhere to an outer circumference of a spit; a dough baking section for baking the liquid dough to form the baked dough around the spit; conveyance means for conveying the spit between the dough supply section and the dough baking section; at least one kind of forming tool including a forming surface conforming to a shape of at least a part of an outer shape of the spit; and drive means for pressing the at least one kind of forming tool against the baked dough in the shape of the layer that is formed around the spit.

It is preferred that the production device for layered food having the above-mentioned configuration further include rotation control means for rotating the spit, and the at least one kind of forming tool be pressed against the baked dough under a state in which the baked dough is directed in a predetermined direction through rotation of the spit by a predetermined angle.

Further, it is preferred that the dough baking section include a water storage container for storing water, and be configured to evaporate and scatter the water in the water storage container to the dough baking section by using heat generated during baking.

Further, it is preferred that the water storage container have an opened upper surface, and be arranged at a position below the spit with the liquid dough being baked.

Further, it is preferred that the dough supply section include: a dough tray for storing the liquid dough; and raising and lowering means for raising and lowering the dough tray in an up-down direction, and the liquid dough be caused to adhere to the outer circumference of the spit by raising the dough tray and rotating the spit under a state in which the spit is soaked in the liquid dough.

Further, it is preferred that the production device further include a shutter for opening and closing a communication passage between the dough supply section and the dough baking section, and the shutter be made of a heat insulating material.

Further, it is preferred that the dough baking section include a plurality of baking regions capable of baking the liquid dough, and the spit be delivered to the dough supply section after being successively conveyed to the plurality of baking regions in the dough baking section by the conveyance means.

The above-mentioned object of the present invention is also achieved by a production method for layered food to be produced by laminating a plurality of pieces of baked dough in a shape of a layer so as to surround an inner hole, the production method including: a coating step of causing liquid dough to adhere to an outer circumference of a spit; a baking step of baking the liquid dough to form the baked dough around the spit; and a forming step of forming an outer shape of the baked dough so that the outer shape of the baked dough conforms to an outer shape of the spit by pressing at least one kind of forming tool, including a forming surface conforming to a shape of at least a part of the outer shape of the spit, against the baked dough in the shape of the layer that is formed around the spit.

It is preferred that, in the production method for layered food having the above-mentioned configuration, the at least one kind of forming tool be pressed against the baked dough while changing a direction of the baked dough through rotation of the spit by a predetermined angle.

Further, it is preferred that the forming step be performed after the coating step and the baking step are performed repeatedly a plurality of times.

Further, it is preferred that the baking step include baking the liquid dough while evaporating and scattering water stored in a water storage container by using heat generated during baking.

Further, it is preferred that the water storage container have an opened upper surface, and be arranged at a position below the spit with the liquid dough being baked.

Advantageous Effects of Invention

According to one embodiment of the present invention, the outer shape and the inner hole shape of layered food can be formed into various shapes such as a polygonal shape, a heart shape, a star shape, and a Japanese apricot shape, instead of a circular shape. Therefore, the external appearance of the layered food can be full of uniqueness and unexpectedness. Consequently, the layered food can have strong impression on consumers and arouse consumers' eagerness to buy the product.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1(A) is a front view of layered food having a square outer shape, and FIG. 1(B) is a perspective view thereof.

FIG. 2(A) is a front view of layered food having a pentagonal outer shape, and FIG. 2(B) is a perspective view thereof.

FIG. 3(A) is a front view of layered food having a hexagonal outer shape, and FIG. 3(B) is a perspective view thereof.

FIG. 4(A) is a front view of layered food having a heart outer shape, and FIG. 4(B) is a perspective view thereof.

FIG. 5(A) is a front view of layered food having a Japanese apricot outer shape, and FIG. 5(B) is a perspective view thereof.

FIG. 22 is an explanatory view illustrating a method of forming layered food having a square outer shape.

FIG. 23 is an explanatory view illustrating a method of forming layered food having a pentagonal outer shape.

FIG. 24 is an explanatory view illustrating a method of forming layered food having a hexagonal outer shape.

FIG. 26 is an explanatory view illustrating a method of forming layered food having a Japanese apricot outer shape.

FIG. 27 is an explanatory view illustrating a method of forming layered food having a star (five-rayed star) outer shape.

FIG. 28 is an explanatory view illustrating a method of forming layered food having a star (six-rayed star) outer shape.

FIG. 29 is an explanatory view illustrating a method of forming layered food having a water clover outer shape.

DESCRIPTION OF EMBODIMENTS

Now, embodiments of the present invention are described with reference to the attached drawings. FIGS. 1 to 5 each illustrate an external appearance of layered food 1 produced by a production device and a production method for layered food according to an embodiment of the present invention. In FIGS. 1 to 5, FIGS. 1(A) to 5(A) are front views of the layered food 1, and FIGS. 1(B) to 5(B) are perspective views of one end side portion of the layered food 1.

Figure 10:
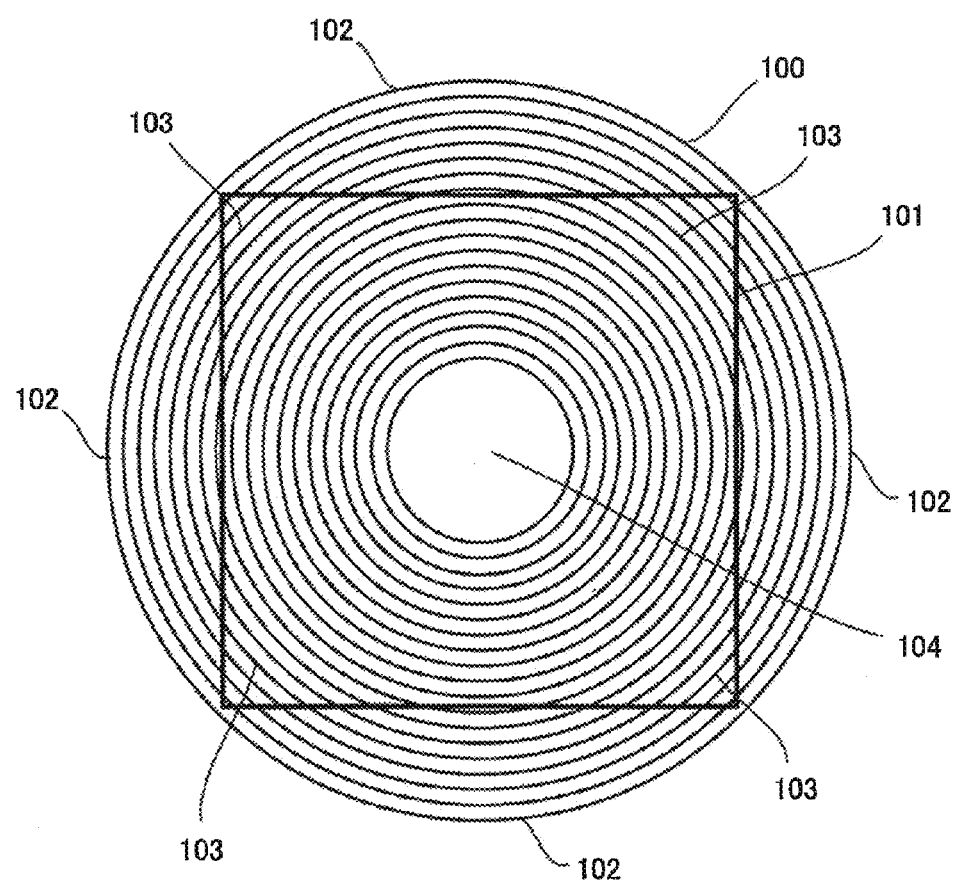
FIG. 10 is a front view of layered food of a comparative example.

The layered food 1 has a tubular shape in which a plurality of pieces of baked dough 11 are laminated in the shape of a layer so as to surround an inner hole 10, and a baked cake such as Baumkuchen is given as an example. The layered food 1 of this embodiment has a feature in that an outer shape and an inner shape (outer shape of the inner hole 10) are substantially similar to each other as in traditional Baumkuchen, but are not circular. Further, unlike layered food 100 obtained by cutting a square shape, for example, from traditional cylindrical Baumkuchen as illustrated in FIG. 10, the layered food 1 of this embodiment has a feature in that the baked dough 11 in all the layers ranging from the baked dough 11 in a layer on an innermost side (innermost layer) to the baked dough 11 in a layer on an outermost side (outermost layer) is laminated so as to surround the entire circumference of the hole 10. For example, when the outer shape of the layered food 1 and the outer shape of the hole 10 are a square shape, a pentagonal shape, a hexagonal shape, a heart shape, or a Japanese apricot shape as illustrated in FIGS. 1 to 5, the layered food 1 has a feature in that layers (baked dough 11) each having a square, pentagonal, hexagonal, heart, or Japanese apricot outer shape are arranged in a concentric pattern from an inner circumferential edge to an outer circumferential edge of the layered food 1. Note that, the term "outer shape" refers to a shape forming a contour of the layered food 1 or the hole 10. Further, the term "substantially similar" refers to close similarity of shapes instead of referring to a relationship in which one graphic is perfectly scaled up or down. That is, for example, in FIGS. 1 to 3, the layered food 1 has round corners and the outer shape thereof is not a perfect polygonal shape as in the outer shape of the inner hole 10. However, the outer shape of the layered food 1 is a polygonal shape having the same number of sides as that of the inner hole 10, and the shape of the layered food 1 is roughly similar to the shape of the inner hole 10. In this respect, the layered food 1 and the inner hole 10 are substantially similar to each other.

As described above, the outer shape of the layered food 1 is different from a conventional circular shape, and the outer shape of the inner hole 10 is also different from a circular shape. Therefore, the external appearance of the layered food 1 can be rendered full of uniqueness and unexpectedness. Accordingly, the layered food 1 can have strong impression on consumers and arouse consumers' eagerness to buy the product.

Further, in the case of producing layered food 101 having a different shape by cutting a square shape, for example, from the traditional cylindrical Baumkuchen 100 as illustrated in FIG. 10, a remaining portion 102 of the original Baumkuchen 100 which remains after cutting becomes a waste. Moreover, in a corner portion 103 of the layered food 100, the baked dough is not laminated so as to surround the circumference of a hole 104. Therefore, the corner portion 103 is likely to peel from an adjacent layer of baked dough, and the corner portion 103 comes off from the layered food 100 during eating, causing a problem of a bad appearance. In contrast, in the layered food 1 of this embodiment, the baked dough 11 in all the layers is laminated so as to surround the entire circumference of the hole 10. Therefore, there is no risk that the baked dough 11 peels from another layer of baked dough 11 to come off from the layered food 1, with the result that a good appearance can also be exhibited during eating. Accordingly, by using the layered food 1 as a gift cake for Christmas Day and St. Valentine's Day as well as celebratory occasions such as a wedding, admission to a school, and new employment, depending on the outer shape, a commodity value thereof can be enhanced.

Figure 6:
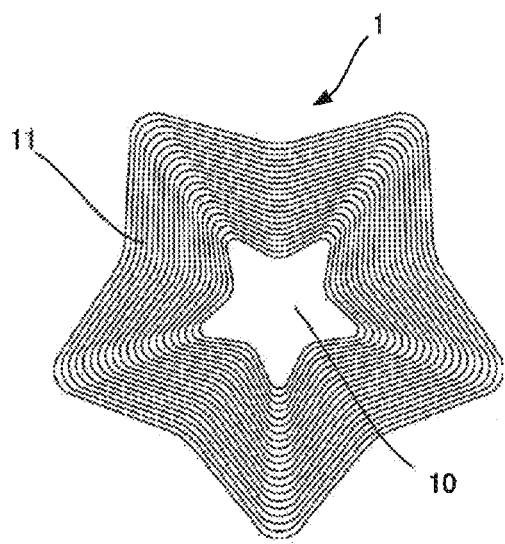
FIG. 6 is a front view of layered food having a star (five-rayed star) outer shape.
Figure 7:
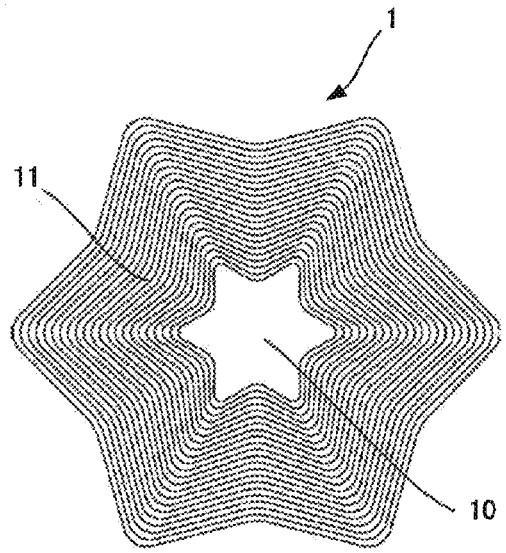
FIG. 7 is a front view of layered food having a star (six-rayed star) outer shape.
Figure 8:
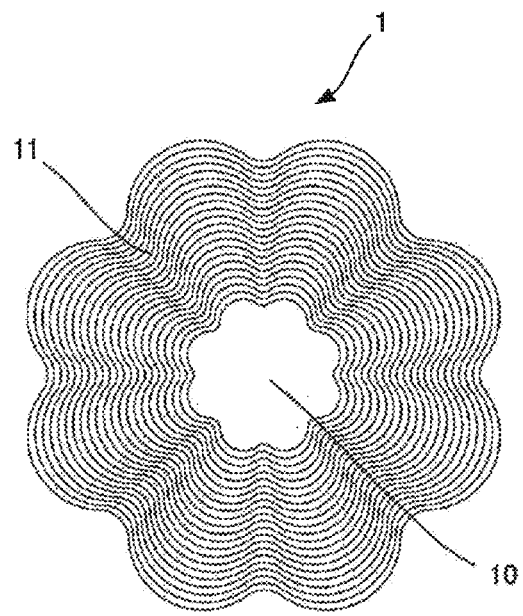
FIG. 8 is a front view of layered food having a water clover outer shape.
Figure 9:
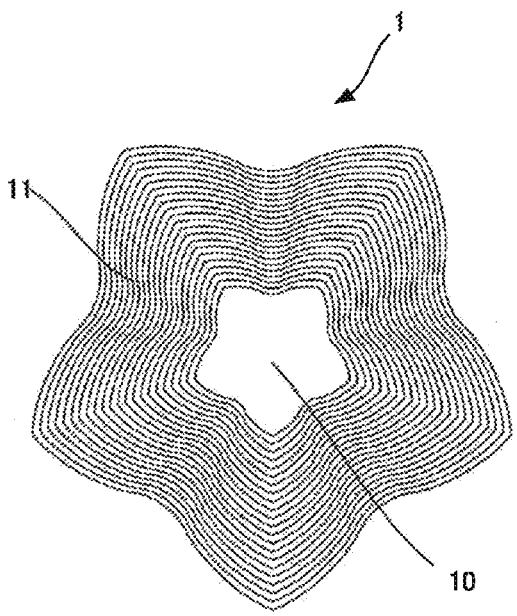
FIG. 9 is a front view of layered food having a bellflower outer shape.

Note that, the outer shape of the layered food 1 and the outer shape of the hole 10 can be formed into various shapes such as a square shape, a pentagonal shape, a hexagonal shape, a heart shape, and a Japanese apricot shape illustrated in FIGS. 1 to 5, other polygonal shapes, star shapes (illustrated in FIGS. 6 and 7), a bellflower shape (illustrated in FIG. 8), and a water clover shape (illustrated in FIG. 9), and the outer shape of the layered food 1 and the outer shape of the hole 10 are not limited.

Figure 11:
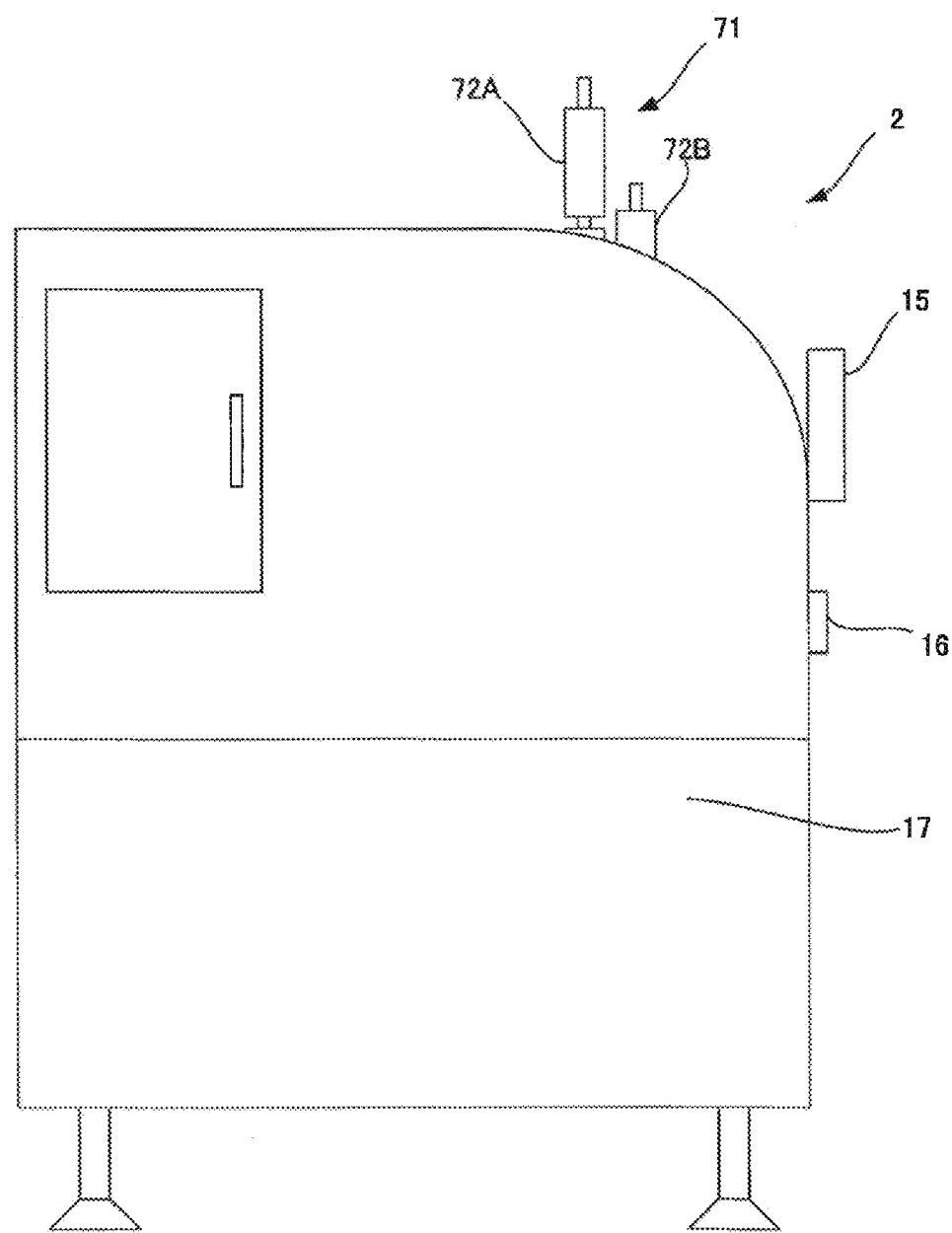
FIG. 11 is a schematic side view of a production device according to an embodiment of the present invention.
Figure 12:
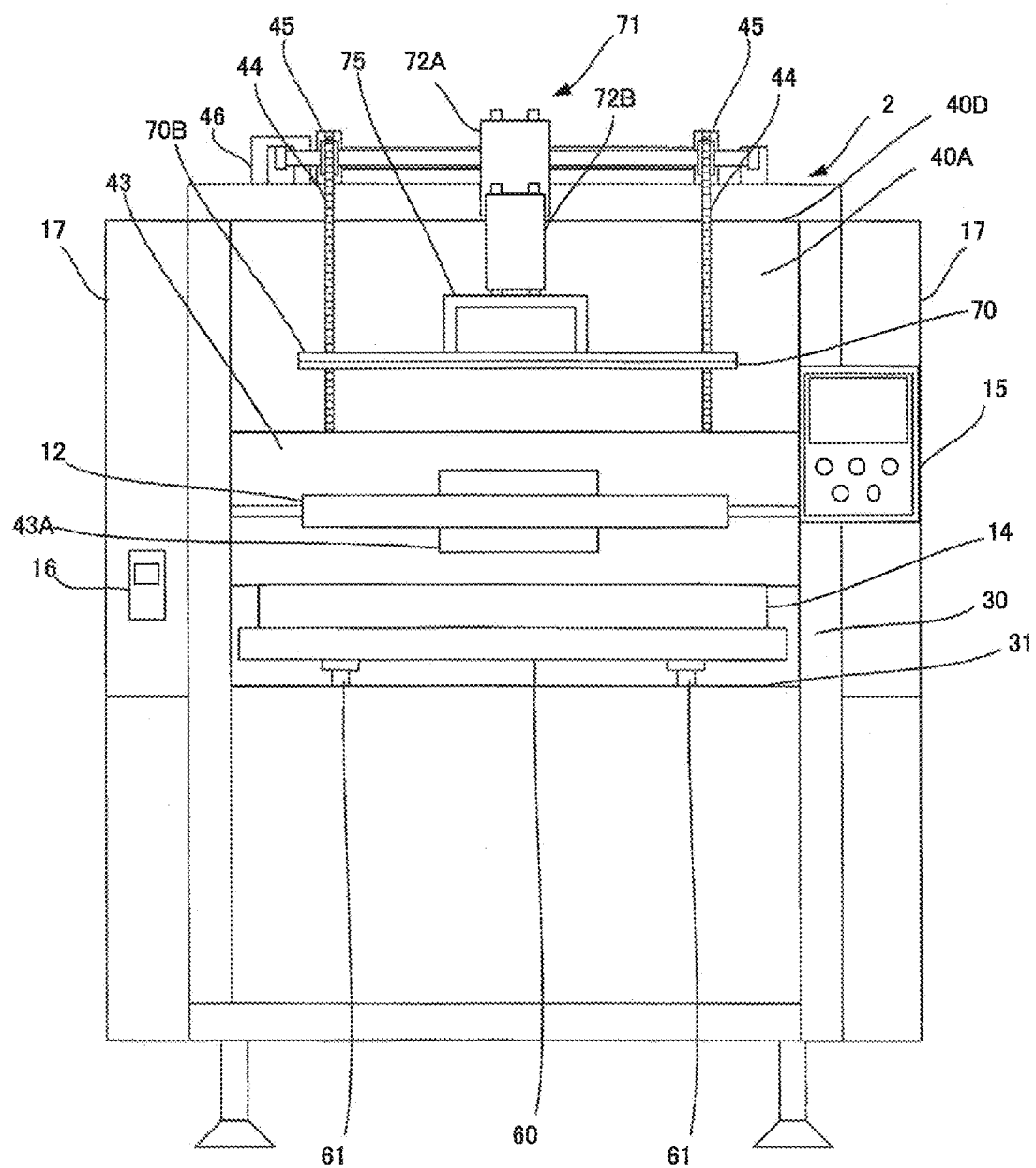
FIG. 12 is a schematic front view of the production device of FIG. 11.
Figure 13:
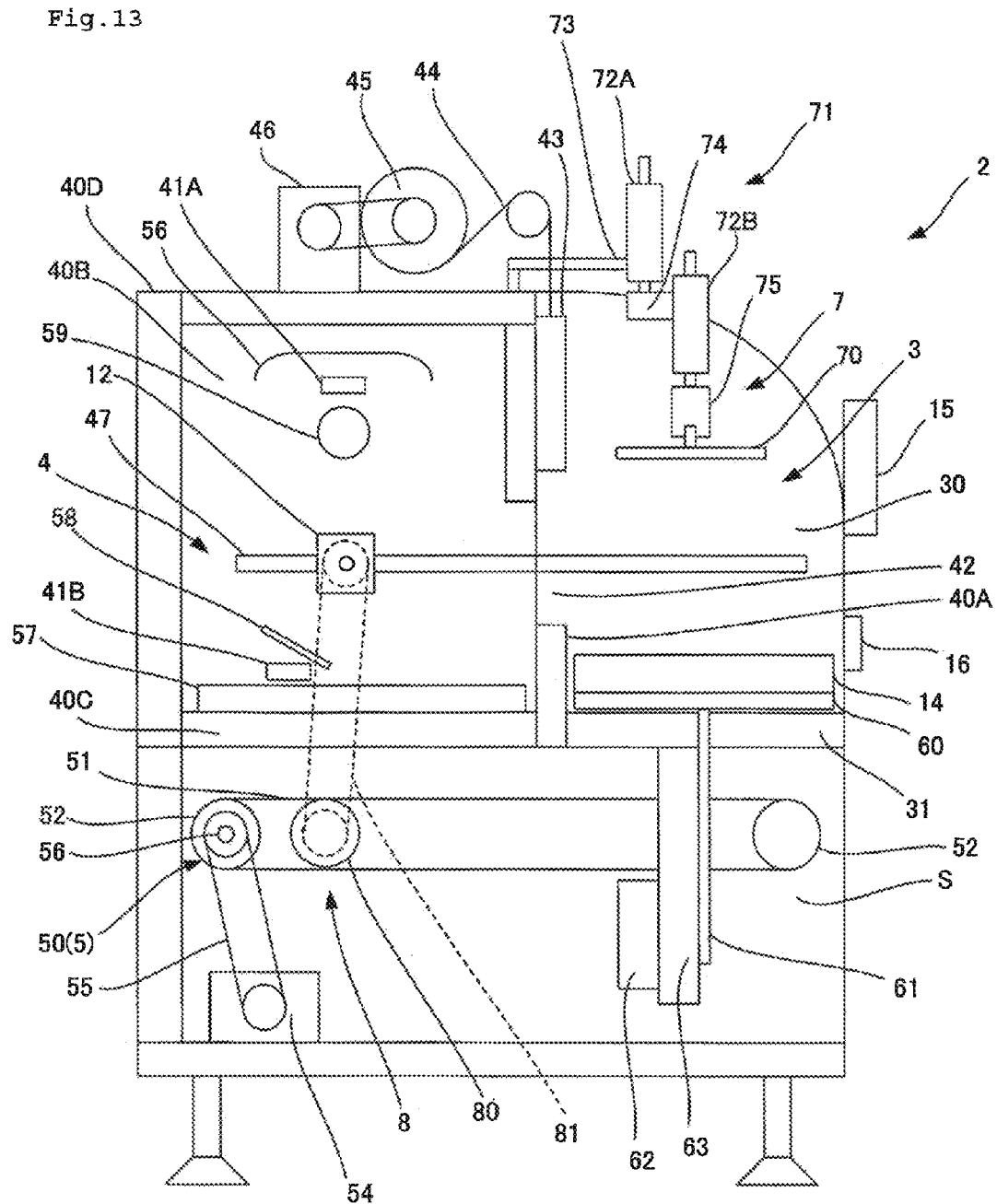
FIG. 13 is a schematic sectional view illustrating an internal structure viewed from a side surface side of the production device of FIG. 11.
Figure 14:
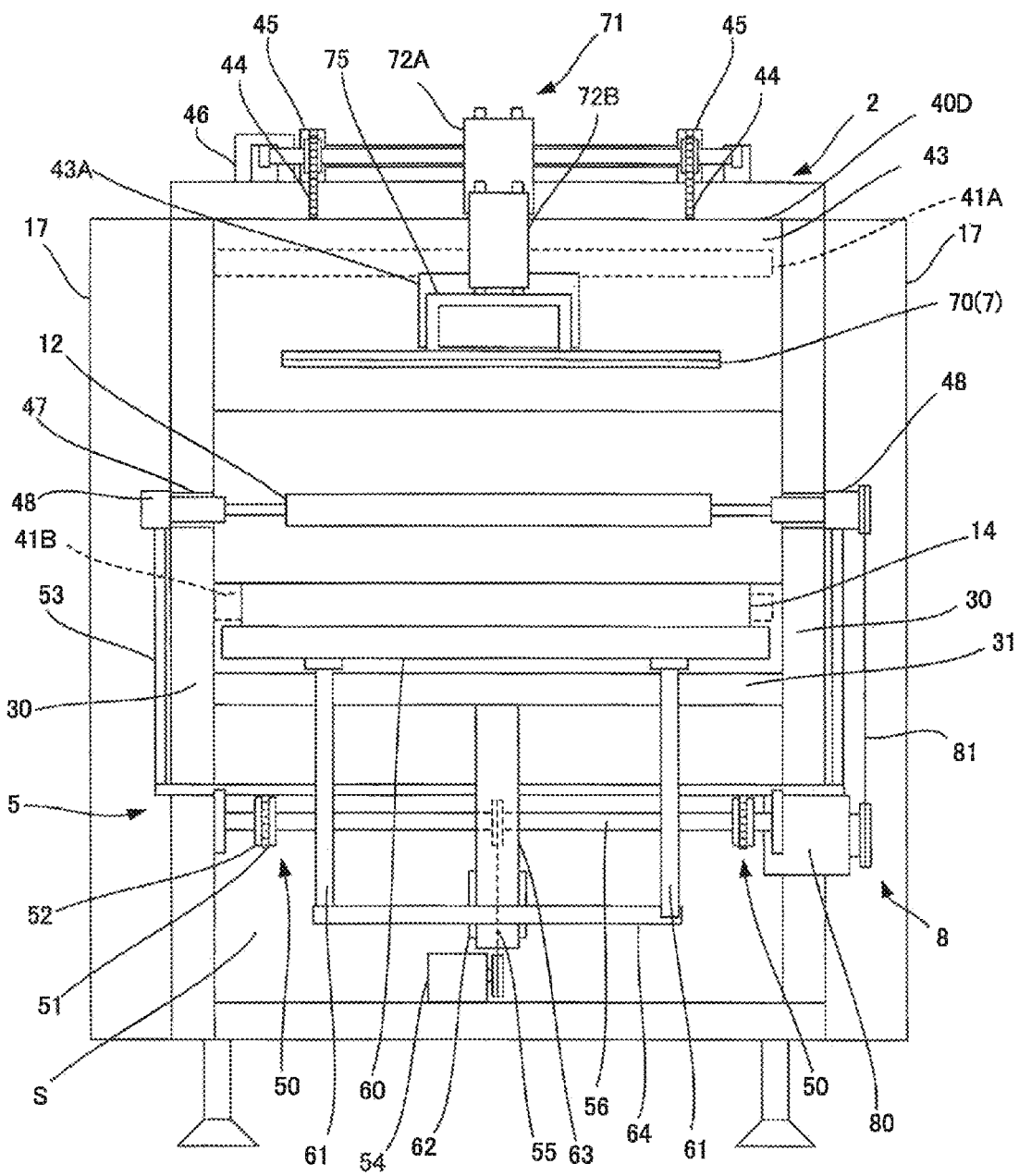
FIG. 14 is a schematic sectional view illustrating an internal structure viewed from a front surface side of the production device of FIG. 11.

Next, a production device for producing the layered food 1 having the above-mentioned configuration is described. FIGS. 11 and 12 are a schematic side view and a schematic front view of a production device 2 for layered food according to an embodiment of the present invention (hereinafter referred to simply as "production device 2"). Further, FIGS. 13 and 14 are schematic sectional views illustrating an internal structure of the production device 2.

The production device 2 of this embodiment includes a dough supply section 3 for supplying liquid dough to the outer circumference of a spit 12, a dough baking section 4 for baking the liquid dough to form baked dough 11 around the spit 12, conveyance means 5 for conveying the spit 12 between the dough supply section 3 and the dough baking section 4, forming means 7 for forming an outer circumferential surface of the baked dough 11 laminated around the spit 12 so that the outer circumferential surface conforms to the outer shape of the spit 12 by subjecting the outer circumferential surface to press forming, and rotation control means 8 for rotating the spit 12.

In the production device 2 of this embodiment, for example, as illustrated in FIGS. 15 to 21, a plurality of kinds of spits 12 having various outer shapes are prepared. The spit 12 includes a pair of right and left shafts 12A in the shape of a round bar and a columnar main section 12b having a predetermined length. The shaft 12A serves as a central axis of the spit 12 and is inserted in a hollow inner portion of the main section 12B. The shafts 12A are supported by a pair of right and left bearings 48 (illustrated in FIG. 21) of the production device 2 so that the spit 12 may be set in the production device 2. The shaft 12A is provided with a pin 12C for positioning, and when the spit 12 is set at the bearings 48 of the production device 2, the initial position of the spit 12 is set depending on the position of the pin 12C. When the initial position of the spit 12 is set, the rotation position of the spit 12 when the spit 12 rotates is to be monitored by a control device (not shown). The material for the shaft 12A is not limited, and for example, stainless steel having high structural strength and excellent heat resistance can be used preferably.

The layered food 1 is formed in a state of being rolled around the main section 12B, and hence the main section 12B forms the outer shape of the layered food 1 as well as the inner hole 10 of the layered food 1. Thus, for example, when the outer shape of the main section 12B is formed into a square shape, a pentagonal shape, a hexagonal shape, a heart shape, a Japanese apricot shape, or a star shape as illustrated in FIGS. 15 to 21, the outer shape of the layered food 1 and the outer shape of the inner hole 10 can be respectively formed into a square shape, a pentagonal shape, a hexagonal shape, a heart shape, a Japanese apricot shape, or a star shape (five-rayed star shape or a six-rayed star shape). Although the main section 12B is made of wood in this embodiment, the main section 12B may be made of a resin, a metal, a bamboo, or earthenware without being limited to wood. The main section 12B is covered with a release sheet such as an aluminum foil or release paper so that dough does not adhere to the main section 12B during production of the layered food 1. Note that, in the main section 12B having a heart outer shape, a Japanese apricot outer shape, or a star (five-rayed star or six-rayed star) outer shape as illustrated in FIGS. 18 to 21, a cord is arranged along a depressed concave groove portion 12D of the outer circumferential surface over the full length of the main section 12B. This allows the release sheet to be fixed in close contact with the main section 12B without being floated therefrom, and hence the outer shape of the hole 10 of the layered food 1 can be formed more clearly by the main section 12B. The outer shape of the main section 12B is not limited to those illustrated in FIGS. 15 to 21, and can be formed into various shapes such as other polygonal shapes, a bellflower shape, or a water clover shape in accordance with the intended outer shape of the layered food 1.

The spit 12 having a desired outer shape is selected from among the spits 12 having the above-mentioned various shapes and is set at the bearings 48 of the production device 2. Thus, the layered food 1 can be produced, in which the outer shape thereof and the outer shape of the inner hole 10 have a desired different shape other than a circular shape as described above (described later in detail).

As illustrated in FIGS. 11 to 14, the dough baking section 4 of the production device 2 is formed of a housing 40 in which an upper heating device 41A and a lower heating device 41B serving as heat sources are arranged on upper and lower sides. It is appropriate that known heating devices such as a gas burner, an infrared burner, or an electric heater be used as the upper heating device 41A and the lower heating device 41B, and the upper heating device 41A and the lower heating device 41B are provided so as to extend in the right-left direction in the housing 40. The upper heating device 41A and the lower heating device 41B are controlled by the control device (not shown), and the baking temperature can be adjusted through a control panel 15 mounted to the production device 2. A temperature sensor (not shown) is provided in the housing 40 so that the temperature inside the housing 40 can be confirmed through a temperature indication unit 16 mounted to the production device 2.

A front surface section 40A of the housing 40 is provided with a rectangular opening 42, and the opening 42 serves as a communication passage through which the spit 12 reciprocates between the dough supply section 3 and the dough baking section 4. Further, the front surface section 40A of the housing 40 is provided with a shutter 43 for opening and closing the opening 42. In this embodiment, the shutter 43 is suspended so as to be moved up and down by a pair of right and left support chains 44. Both the support chains 44 are looped around a pair of right and left loop rollers 45 provided on an upper surface section 40D of the housing 40. When both the loop rollers 46 are rotationally driven in synchronization in a forward/reverse direction by a motor 46 so as to feed and take up both the support chains 44, the shutter 43 is moved up and down, and the opening 42 is accordingly opened and closed by the shutter 43. Note that, the motor 46 serving as a drive source for moving up and down the shutter 43 is controlled by the control device (not shown). Drive means for moving up and down the shutter 43 is not limited to this example. For example, each one end of both the support chains 44 is fixed to a mounting plate mounted to a drive rod of an air cylinder provided on the upper surface section 40D of the housing 40. Then, the shutter 43 may be moved up and down by expanding and contracting the drive rod of the air cylinder to pull up and push down both the support chains.

The material for the shutter 43 may be a metal. However, in order to suppress transfer of heat in the dough baking section 4 to the dough supply section 3 adjacent to the dough baking section 4, it is preferred to use a heat insulating material for heat resistance (heat retaining material) having heat insulation property, which is used in a general kiln and the like. Thus, the temperature of the liquid dough in a dough tray 14 arranged in the dough supply section 3 can be prevented from increasing due to the heat in the dough baking section 4. A rectangular window 43A is provided at the center of the shutter 43 so that the inside of the housing 40 can be confirmed visually. Further, illumination means 59 is provided in the housing 40 so that the inside of the housing 40 is illuminated. As a result, the inside of the housing 40 can visually be confirmed satisfactorily through the window 43A.

In a pair of right and left side surface sections 40B of the housing 40, slide holes 47 extending in a front-back direction are formed so as to be opposed to each other between the upper heating device 41A and the lower heating device 41B. The bearing 48 is mounted to each slide hole 47 so as to move in a front-back direction, and both ends of the spit 12 are supported by the pair of bearings 48. The slide hole 47 extends to a side wall section 30, which defines the dough supply section 3 and is connected to the side surface section 40B of the housing 40. When the pair of bearings 48 are respectively moved in synchronization in a front-back direction through the slide holes 47 by the conveyance means 5, the spit 12 reciprocates between the dough supply section 3 and the dough baking section 4.

In this embodiment, a pair of right and left chain conveyers 50 are provided as the conveyance means 5 in a lower space S of the dough supply section 3 and the dough baking section 4. Each chain conveyer 50 is tensioned by a pair of conveyance pulleys 52 around which an endless conveyance chain 51 is arranged in a front-back direction, and the conveyance pulleys 52 of the opposed chain conveyers 50 are coupled to each other through a coupling shaft 56 and rotate in synchronization. Support frames 53 having the pair of bearings 48 fixed thereto are mounted on the pair of conveyance chains 51. A motor 54 for driving the pair of chain conveyers 50 is provided in the lower space S. A sprocket fixed to a rotation shaft of the motor 54 and a sprocket fixed to the coupling shaft 56 are coupled to each other through a chain 55. When the conveyance pulleys 52 are rotated in a forward/reverse direction by the motor 54, the pair of conveyance chains 51 travel and the support frames 53 are reciprocated and conveyed in a front-back direction. Thus, the pair of bearings 48 and the spit 12 are reciprocated and conveyed in a front-back direction. Note that, the motor 54 serving as a drive source for conveying the spit 12 is controlled by the control device (not shown).

The rotation control means 8 includes a motor 80 which is fixed to the support frame 53 and reciprocates in a front-back direction integrally with the spit 12. As the motor 80, a servo motor is used in this embodiment. A sprocket fixed to a rotation shaft of the motor 80 and a sprocket fixed to the bearing 48 on one side that supports the spit 12 are coupled to each other through a chain 81, and the spit 12 is rotated in a forward/reverse direction by rotating the bearing 48 on one side in a forward/reverse direction with the motor 80. The motor 80 is controlled by the control device (not shown). By controlling the r.p.m. and rotation direction of the motor 80, the spit 12 can be rotated continuously and rotated intermittently by a predetermined angle, and in addition, the rotation position of the spit 12 can be monitored. Note that, the motor 80 is not necessarily required to be formed of a servo motor and may be formed of a brake motor instead. In this case, a sensor (proximity switch or limit switch) for detecting the rotation position of the spit 12 is provided so that the control device (not shown) detects a detection signal of the sensor and monitors the rotation position of the spit 12. Note that, control of rotating the spit 12 intermittently by a predetermined angle can also be performed through use of a clutch or the like.

A heat reflection plate 56 is arranged above the upper heating device 41A in the housing 40 so as to extend in a right-left direction. The heat reflection plate 56 reflects heat, which is released upward from the upper heating device 41A, toward the spit 12 arranged below the upper heating device 41A during baking.

A water storage container 57 having an opened upper surface is provided in a bottom surface section 40C of the housing 40. The water storage container 57 stores water. The water is evaporated by heat released from the upper and lower heating devices 41A, 41B during baking and scattered into the housing 40 (dough baking section 4) so that dough which is being baked may be allowed to contain moisture appropriately. This enables the dough to be baked with moisture and enhances the quality of the baked layered food 1. Further, the water storage container 57 is arranged below the spit 12 which is being used for baking dough. Therefore, even when liquid dough drops from the spit 12 during baking, the liquid dough falls to the water in the water storage container 57, with the result that the dough is prevented from soiling the housing 40 by adhering to the bottom surface section 40C of the housing 40. Further, the dropped dough can be easily discarded by discharging the water in the water storage container 57.

A cover plate 58 is arranged above the lower heating device 41B in the housing 40 so as to extend in a right-left direction. Due to the cover plate 58 provided so as to cover the lower heating device 41B, even when liquid dough drops from the spit 12 during baking, the dough is prevented from soiling the lower heating device 41B by adhering to the lower heating device 41B. The cover plate 58 is arranged above the water storage container 57 in a tilted state so that dough adhering to the cover plate 58 naturally falls to the water storage container 57.

The dough supply section 3 is provided in a space defined by the pair of right and left side wall sections 30 connected to both the side surface sections 40B of the housing 40, a bottom wall section 31, and the front surface section 40A of the housing 40. Note that, the side surface section 40B of the housing 40 and the side of the side wall section 30 are covered with a cover 17.

The dough tray 14 in the shape of a container storing liquid dough is provided in the dough supply section 3. The dough tray 14 is supported by a support platform 60, and a plurality of (two in this embodiment) support rods 61 extending downward through the bottom wall section 31 are fixed to a lower surface of the support platform 60. Lower ends of both the support rods 61 are coupled to a coupling member 64 which is moved up and down through intermediation of a known rack and pinion mechanism 63 by a motor 62. The dough tray 14 is raised and lowered in an up-down direction by moving up and down the support platform 60 together with the support rods 61 through control of the motor 62 with the control device (not shown). The dough tray 14 is raised to soak the spit 12 in liquid dough, and the spit 12 is rotated continuously in this state, with the result that the liquid dough is caused to uniformly adhere to the outer circumference of the spit 12. The motor 62, the rack and pinion mechanism 63, and the coupling member 64 form raising and lowering means 6 for raising and lowering the dough tray 14 in an up-down direction, and are provided in the lower space S of the dough supply section 3 and the dough baking section 4. Note that, when a known servomotor is used as the motor 62, the position in an up-down direction of the dough tray 14 can be set in units of millimeters.

The dough supply section 3 includes the forming means 7. The forming means 7 includes a forming tool 70 and drive means 71 for pressing the forming tool 70 against the layered baked dough 11 formed around the spit 12. The forming tool 70 is supported above the spit 12 by the drive means 71 so as to move up and down, and is configured to press, from above the spit 12, the layered baked dough 11 formed around the spit 12.

In this embodiment, the drive means 71 includes two air cylinders 72A, 72B. The one air cylinder 72A is mounted to the upper surface section 40D of the housing 40 by a coupling member 73. The other air cylinder 72B is mounted to a drive rod of the one air cylinder 72A through intermediation of a coupling member 74, and the forming tool 70 is mounted to a drive rod of the other air cylinder 72B through intermediation of a coupling member 79. Due to the expansion and contraction of the drive rods of the two air cylinders 72A, 72B, the forming tool 70 moves up and down in two stages. The two air cylinders 72A, 72B are controlled by the control device (not shown). Note that, although the drive source for moving up and down the forming tool 70 is formed of the air cylinders 72A, 72B in this embodiment, the drive source may be formed of a servo motor.

The forming tool 70 has a plate shape with a width and length larger than a width and length of the main section 12B of the spit 12, and one plate surface thereof includes a forming surface 70A which conforms to a shape of at least a part of the outer shape of the spit 12. A fitting tool 75 for coupling the forming tool 70 to the coupling member 79 is mounted to the other plate surface of the forming tool 70. In the production device 2 of this embodiment, a plurality of kinds of forming tools 70 having the forming surfaces 70A of different shapes are prepared in accordance with the outer shape of the spit 12.

Figure 15:
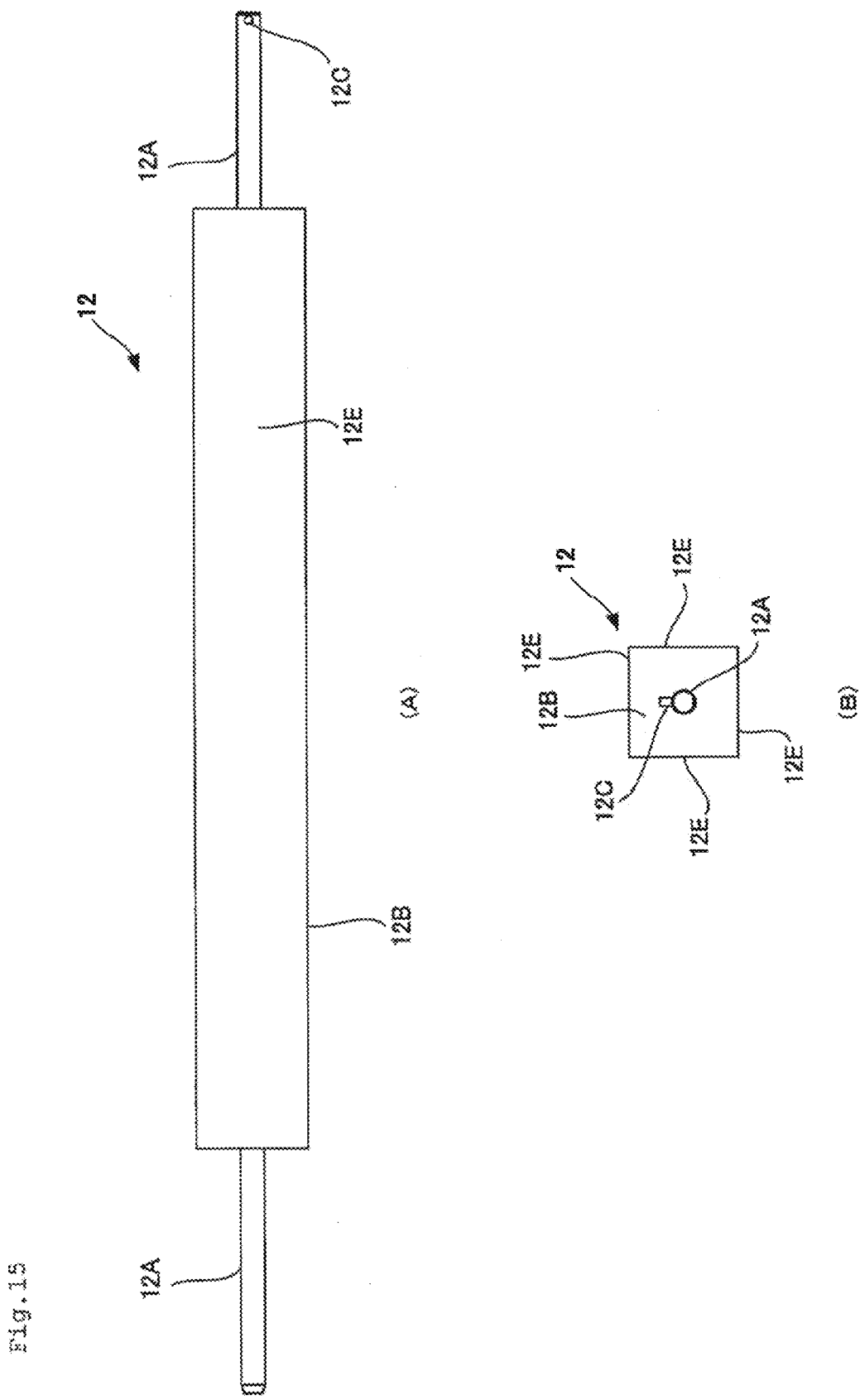
FIG. 15(A) is a plan view of a spit having a square outer shape.
FIG. 15(B) is a side view thereof.
Figure 16:
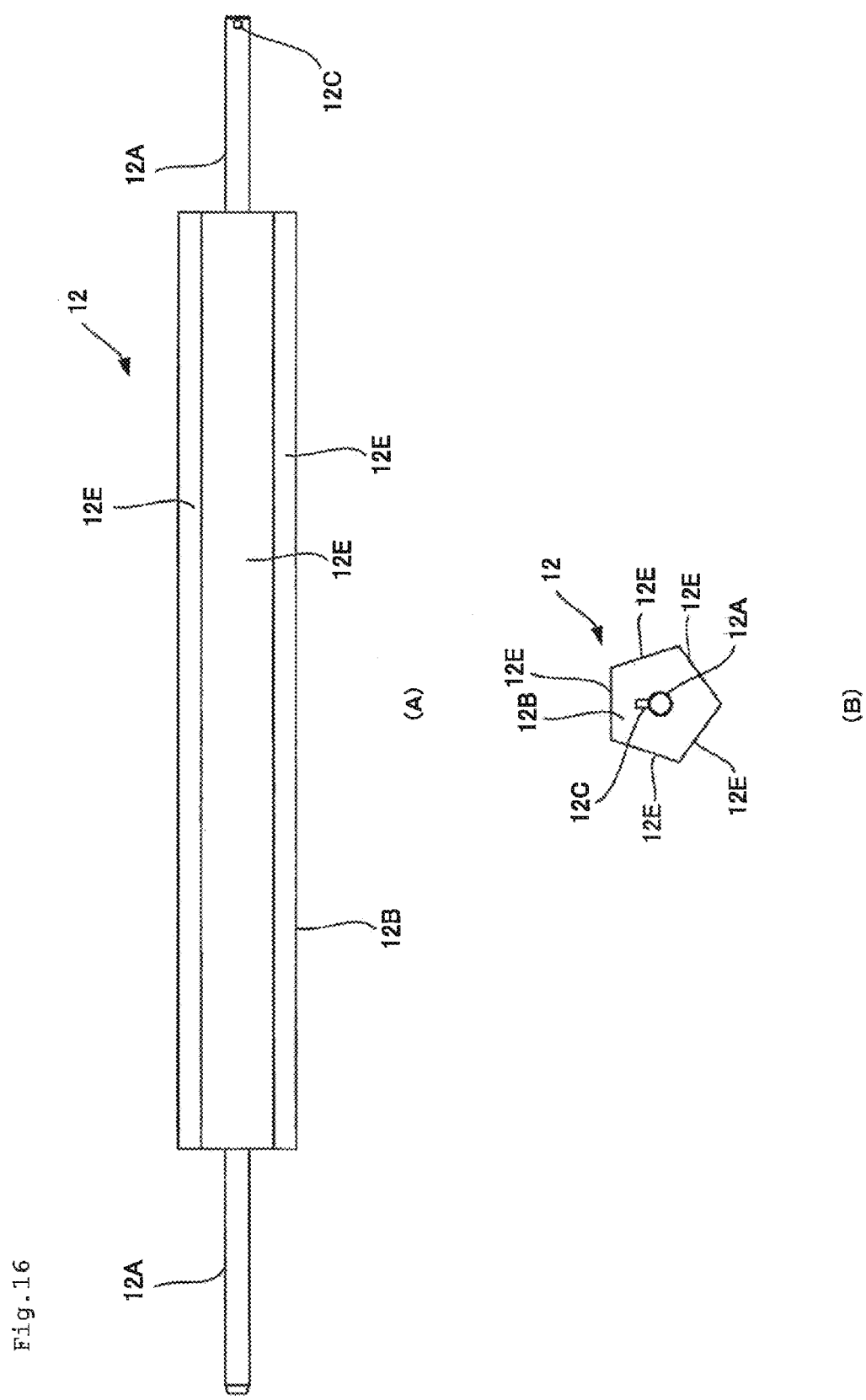
FIG. 16(A) is a plan view of a spit having a pentagonal outer shape.
FIG. 16(B) is a side view thereof.
Figure 17:
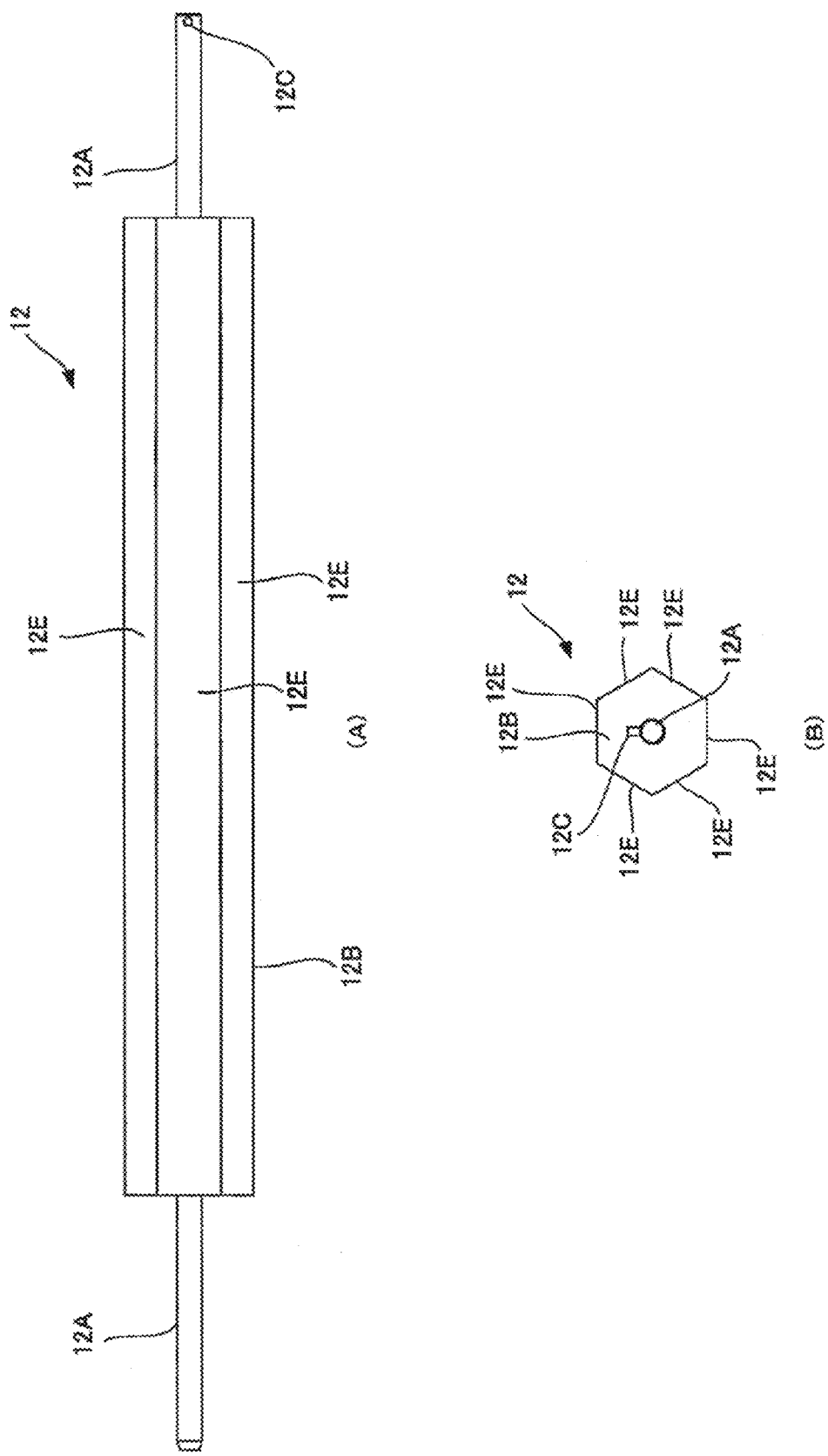
FIG. 17(A) is a plan view of a spit having a hexagonal outer shape.
FIG. 17(B) is a side view thereof.
Figure 18:
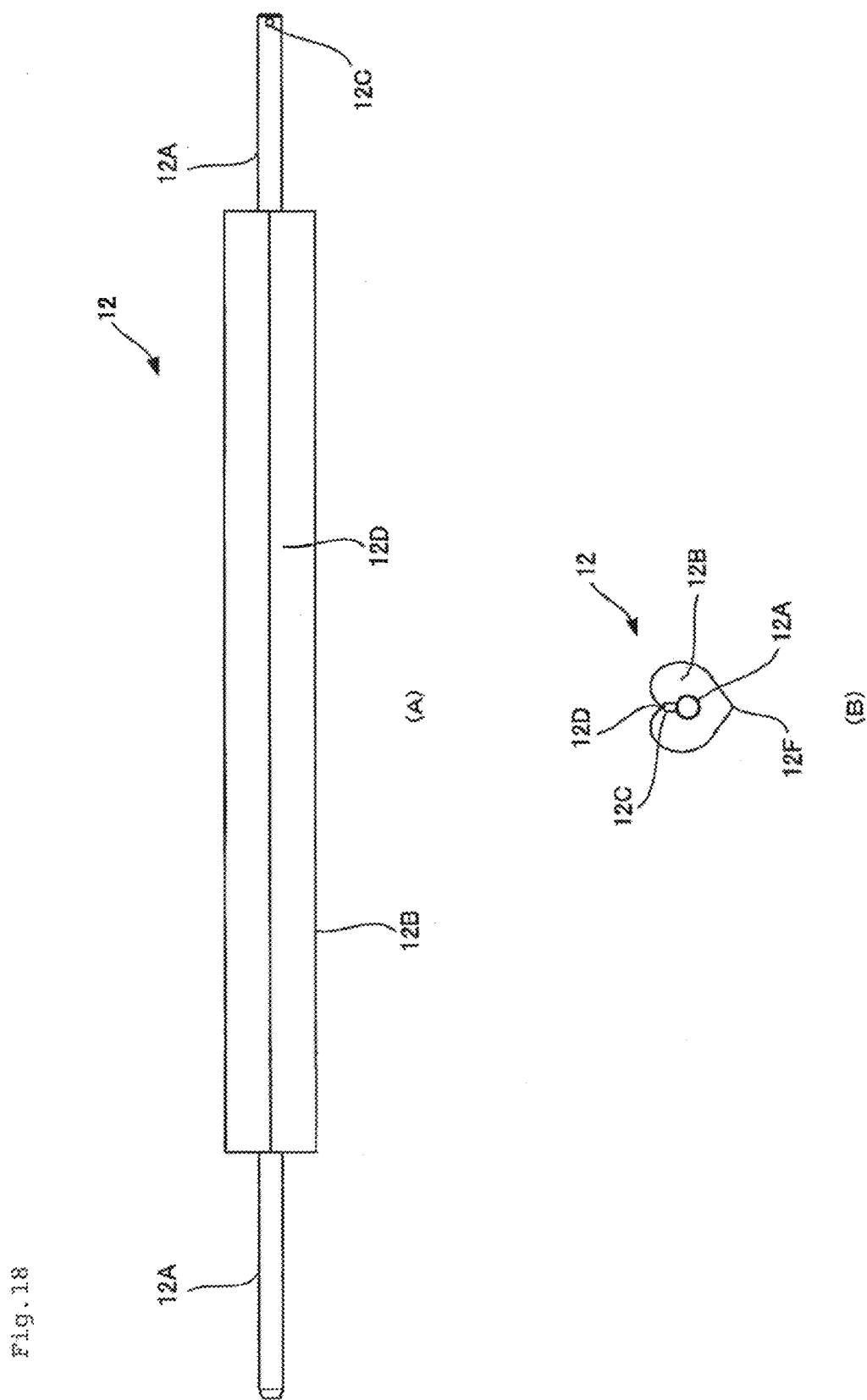
FIG. 18(A) is a plan view of a spit having a heart outer shape.
FIG. 18(B) is a side view thereof.
Figure 19:
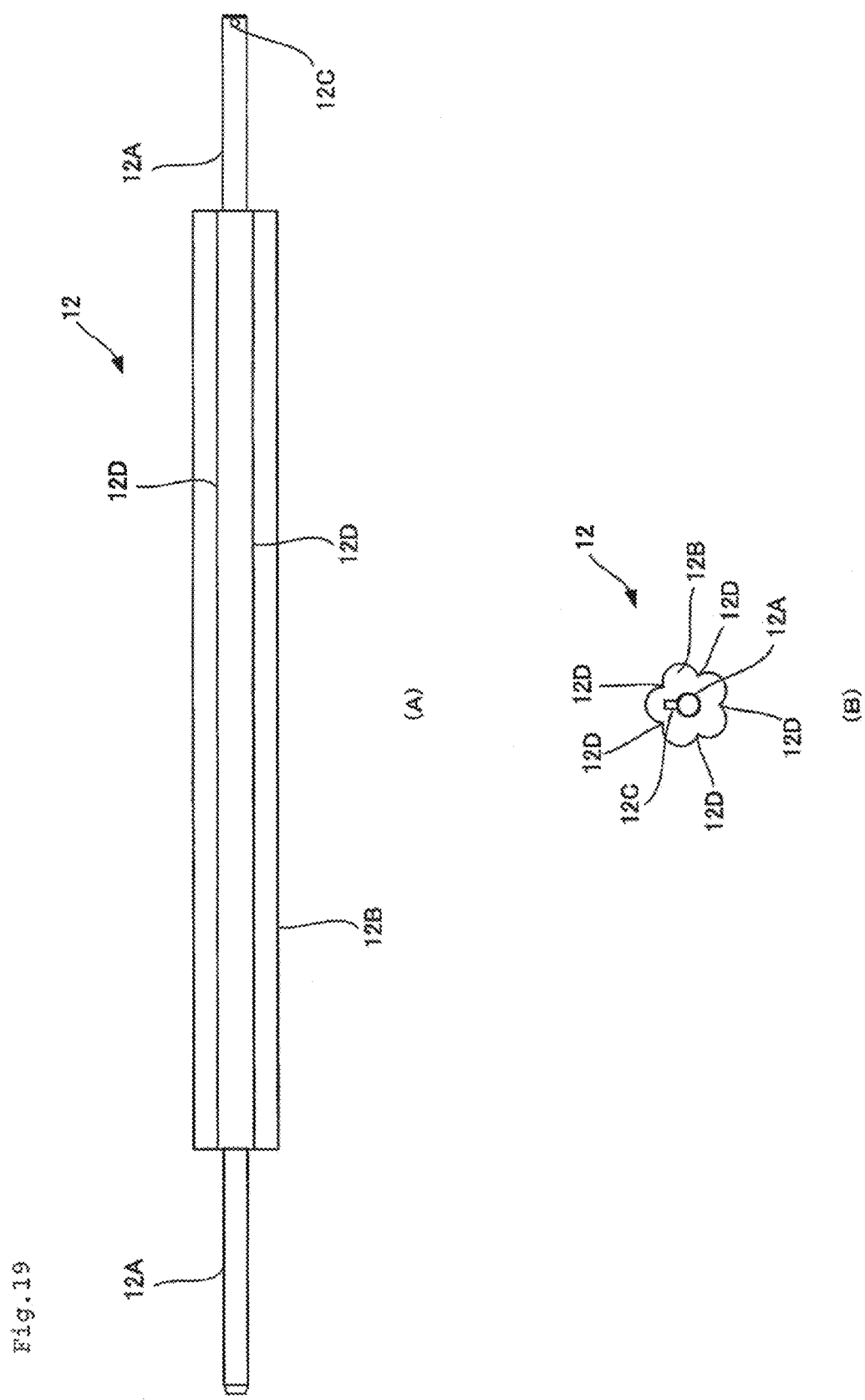
FIG. 19(A) is a plan view of a spit having a Japanese apricot outer shape.
FIG. 19(B) is a side view thereof.
Figure 20:
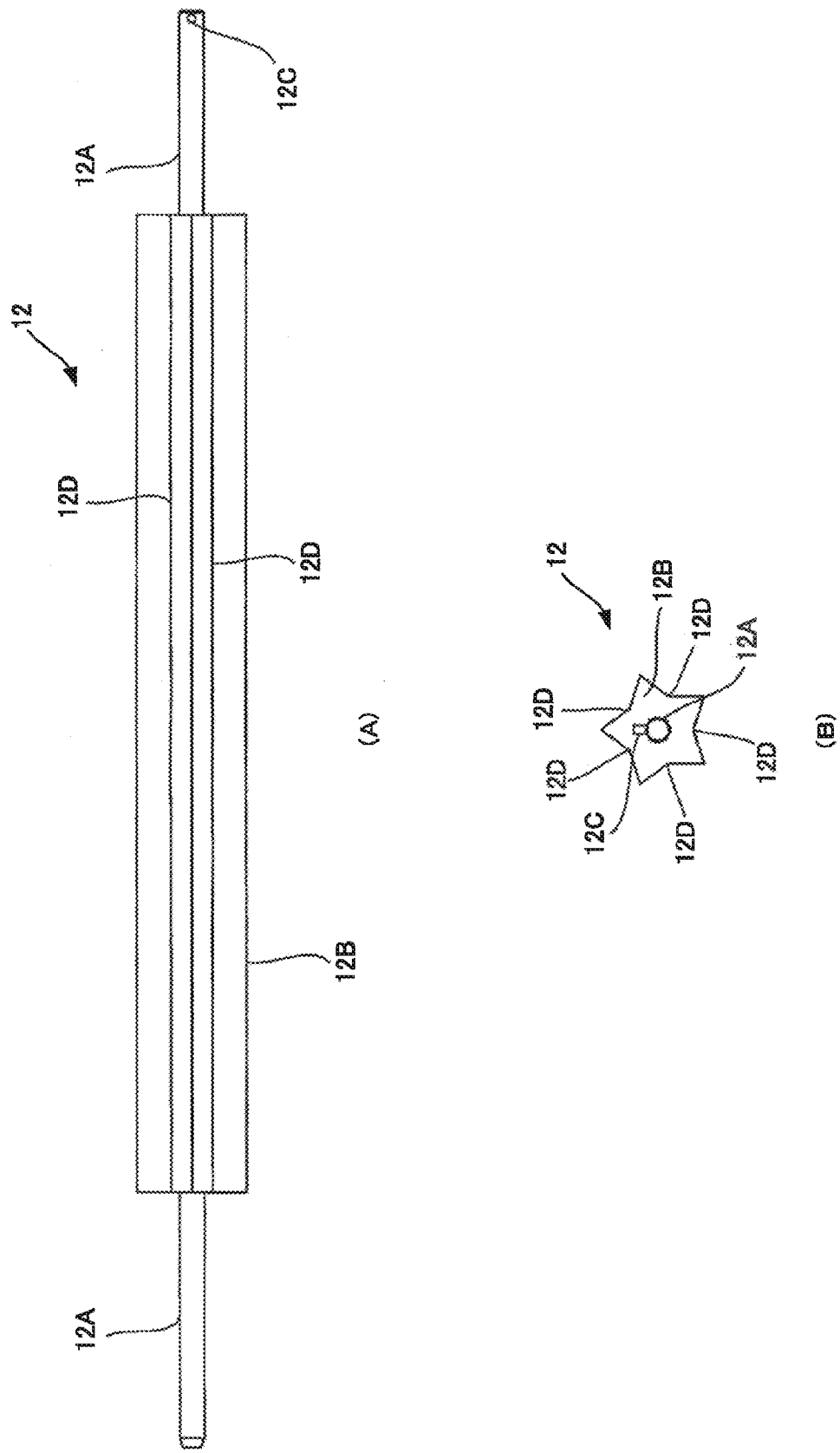
FIG. 20(A) is a plan view of a spit having a star (five-rayed star) outer shape.
FIG. 20(B) is a side view thereof.
Figure 21:
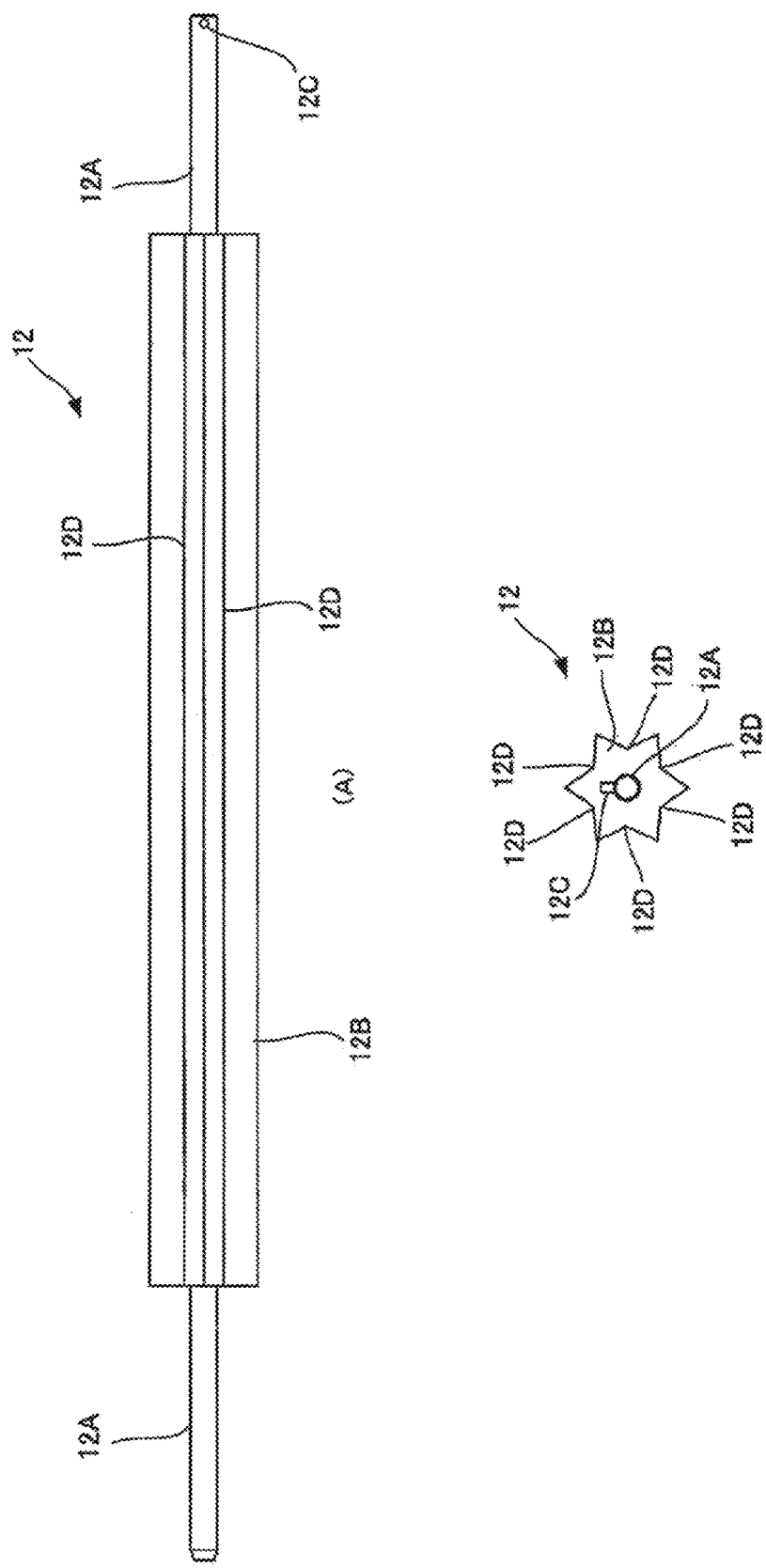
FIG. 21(A) is a plan view of a spit having a star (six-rayed star) outer shape.
FIG. 21(B) is a side view thereof.
Figure 30:
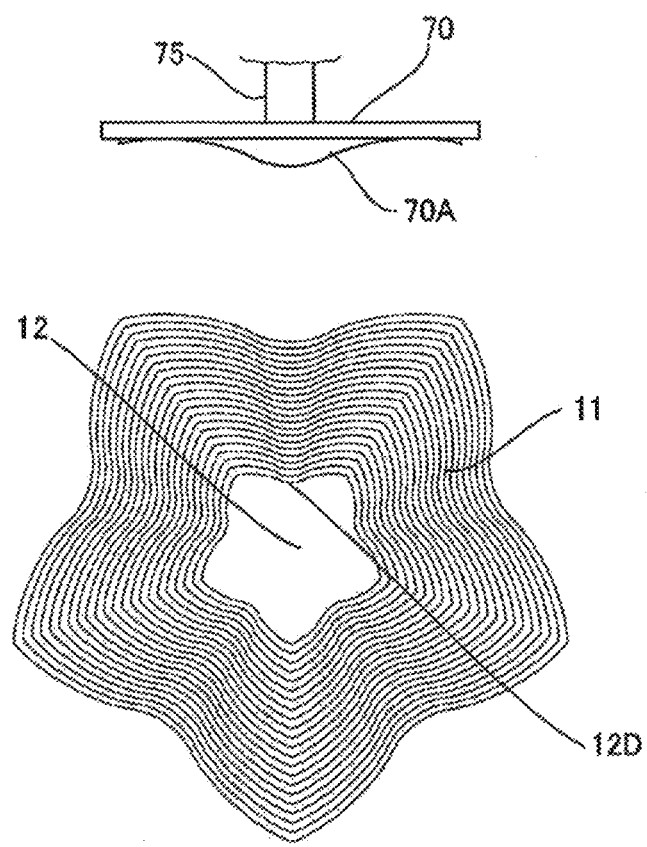
FIG. 30 is an explanatory view illustrating a method of forming layered food having a bellflower outer shape.
Figure 31:
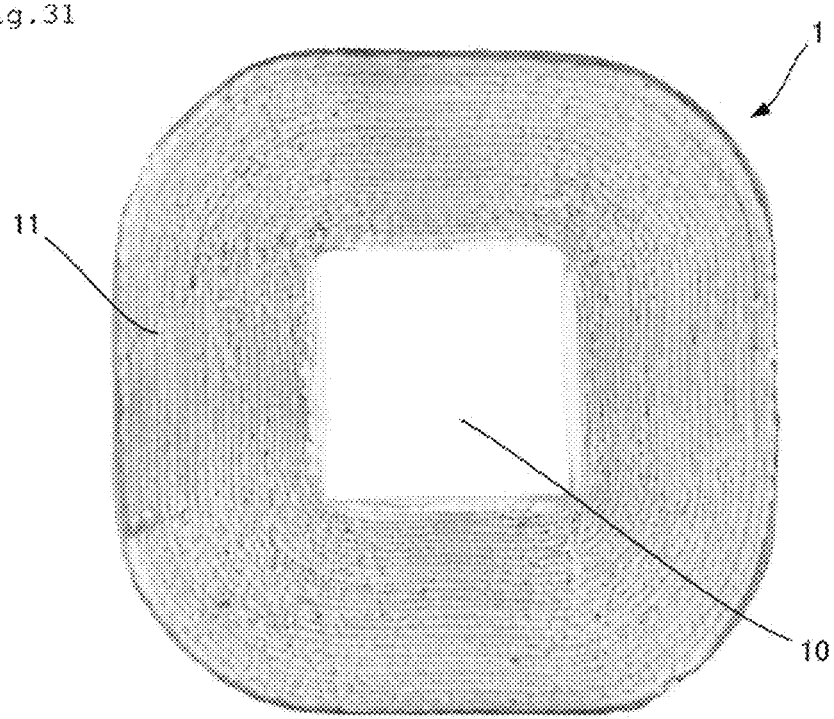
FIG. 31 is a photograph taken from a front surface side of layered food having a square outer shape, which is produced by the production device of the present invention.
Figure 32:
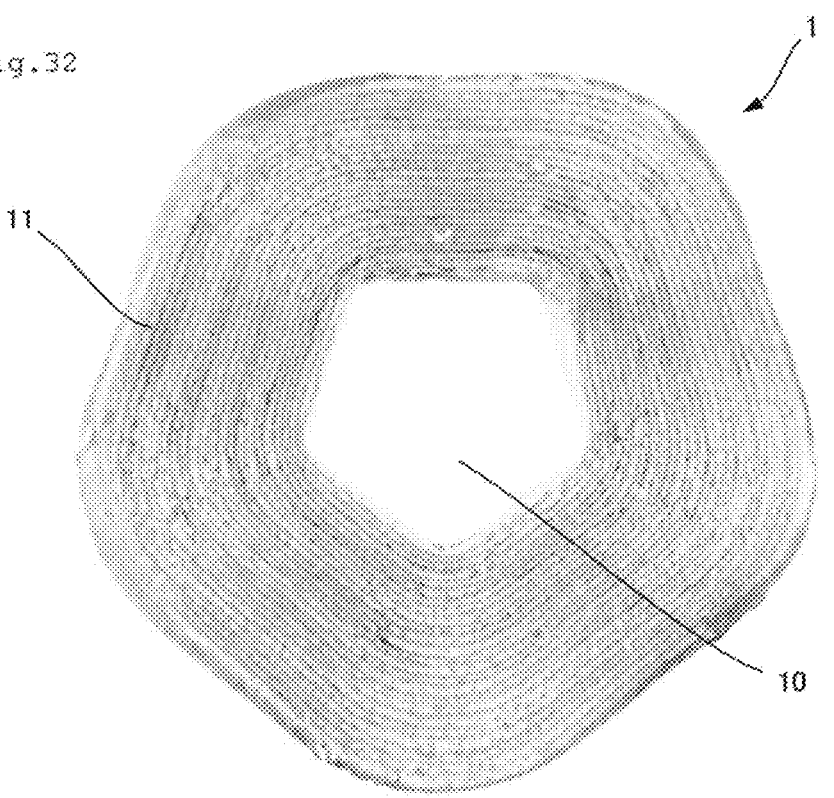
FIG. 32 is a photograph taken from a front surface side of layered food having a pentagonal outer shape, which is produced by the production device of the present invention.
Figure 33:
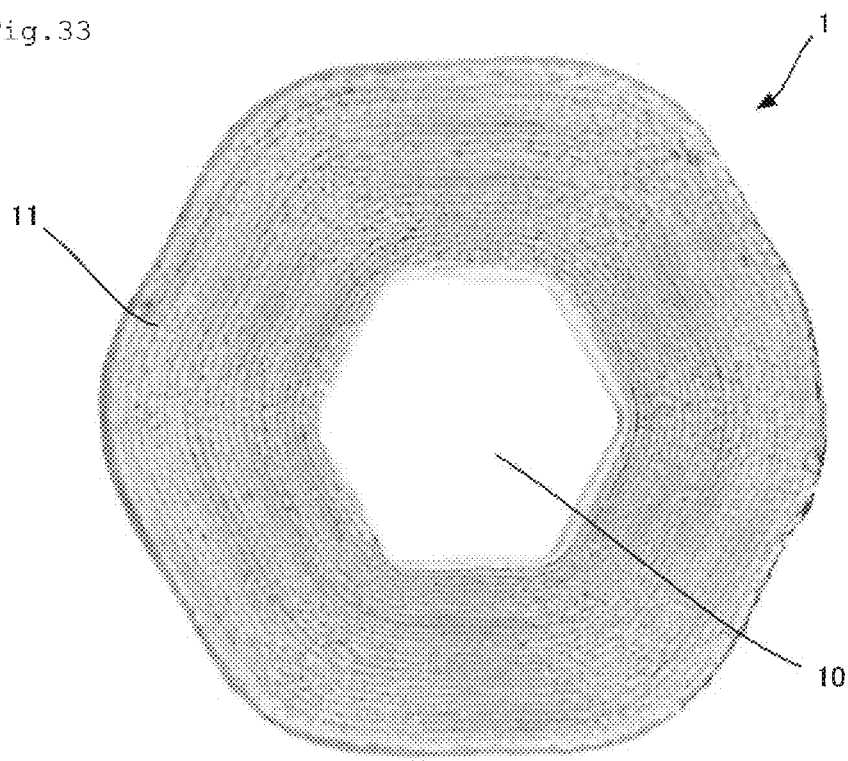
FIG. 33 is a photograph taken from a front surface side of layered food having a hexagonal outer shape, which is produced by the production device of the present invention.
Figure 34:
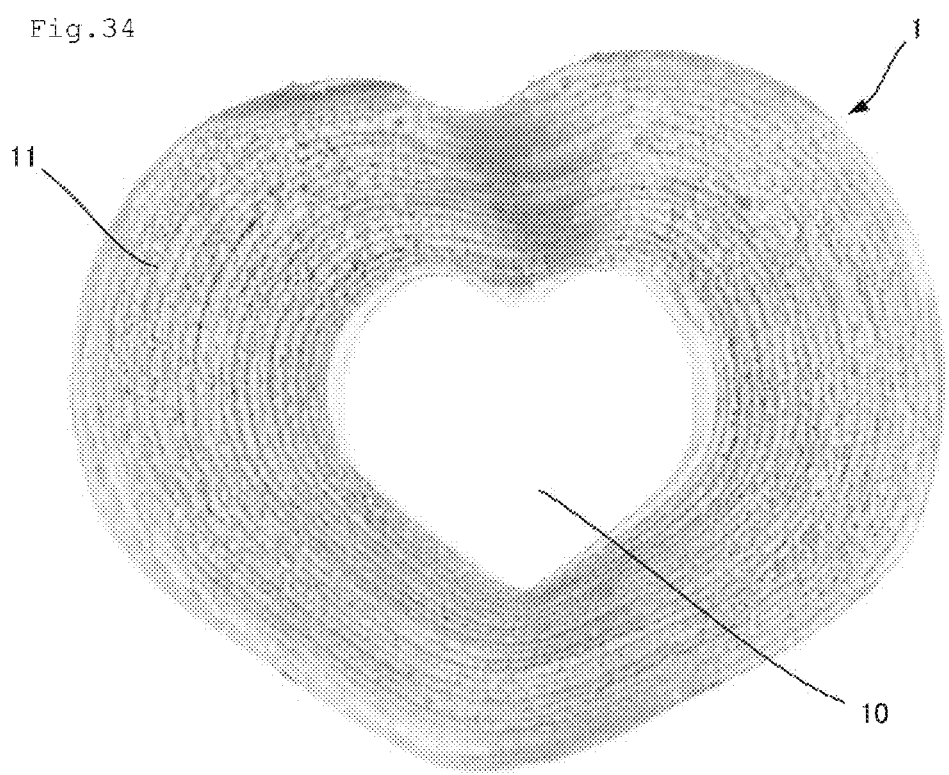
FIG. 34 is a photograph taken from a front surface side of layered food having a heart outer shape, which is produced by the production device of the present invention.
Figure 35:
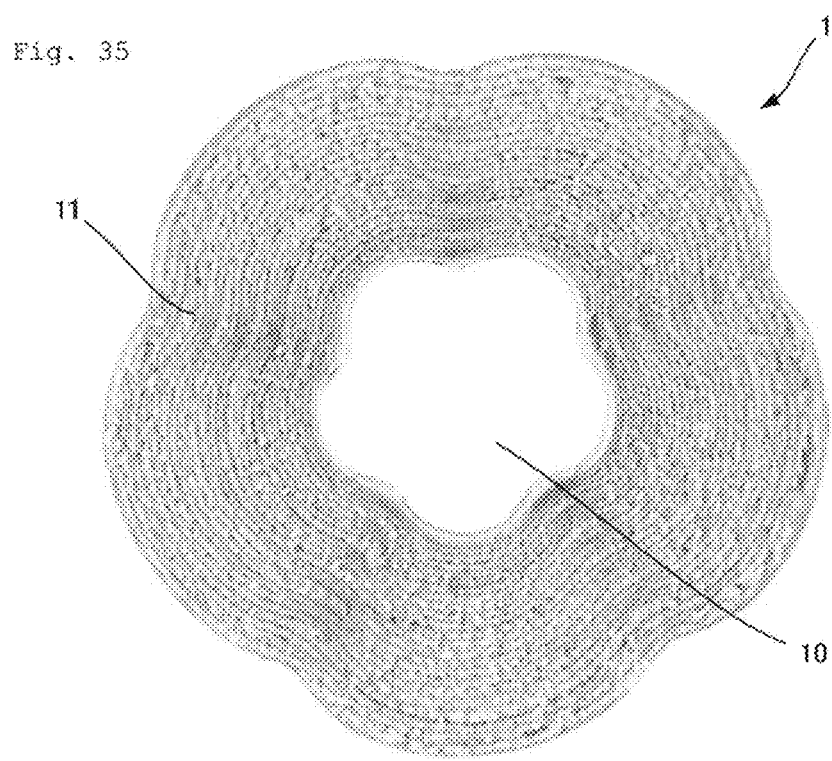
FIG. 35 is a photograph taken from a front surface side of layered food having a Japanese apricot outer shape, which is produced by the production device of the present invention.

The shape of the forming surface 70A is set to a planar shape (illustrated in FIGS. 22 to 24) corresponding to the shape of a planar portion 12E of a part of the outer circumferential surface of the spit 12, for example, with respect to the spit 12 having a polygonal outer shape such as a square outer shape, a pentagonal outer shape, or a hexagonal outer shape as illustrated in FIGS. 15 to 17. Further, regarding the spit 12 having a heart outer shape as illustrated in FIG. 18, the shape of the forming surface 70A is set to a convex curve shape which is curved in a convex shape and is pointed at a tip (illustrated in FIG. 25) with respect to the shape of a concave groove portion 12D of a part of the outer circumferential surface of the spit 12, and is set to a concave curve shape which is bent substantially in an L shape (illustrated in FIG. 25) with respect to the shape of a convex portion 12F of a part of the outer circumferential surface of the spit 12. Further, the shape of the forming surface 70A is set to a convex curve shape which is curved in a convex shape and is pointed at a tip (illustrated in FIG. 26), having a degree of curve of a curved surface (curvature) larger than that in the case of the heart shape, so as to correspond to the shape of a concave groove portion 12D of a part of the outer circumferential surface of the spit 12, with respect to the spit 12 having a Japanese apricot outer shape as illustrated in FIG. 19. Further, the shape of the forming surface 70A is set to a convex curve shape which is bent in a round mountain shape (illustrated in FIGS. 27 and 28) so as to correspond to the shape of a concave groove portion 12D of a part of the outer circumferential surface of the spit 12, with respect to the spit 12 having a star (five-rayed star or six-rayed star) outer shape as illustrated in FIGS. 20 and 21. Further, the shape of the forming surface 70A is set to a convex curve shape which is curved in a convex shape and is rounded at a tip as illustrated in FIGS. 29 and 30, so as to correspond to the shape of a concave groove portion 12D of a part of the outer circumferential surface of the spit 12, with respect to the spit 12 having a water clover outer shape or a bellflower outer shape.

As described above, the plurality of kinds of forming tools 70 are prepared, in which the shape of the forming surface 70A is formed into various shapes in accordance with the shape of at least a part of the outer circumferential surface of the spit 12. The forming tool 70 having the forming surface 70A with a predetermined shape is selected from among the plurality of kinds of forming tools 70 in accordance with the outer shape of the spit 12 to be set in the production device 2, and the selected forming tool 70 is set in the production device 2. Then, the forming tool 70 is pressed against the layered baked dough 11 formed around the spit 12 as needed during production of the layered food 1 to perform press forming, with the result that the outer shape of the layered baked dough 11 can be formed so as to correspond to the outer shape of the spit 12.

Next, a production method for producing the layered food 1 by the production device 2 having the above-mentioned configuration is described. First, liquid dough is supplied to the dough tray 14 in the dough supply section 3. As the liquid dough to be supplied, for example, liquid dough which has been conventionally used for producing Baumkuchen can be used. Then, the dough tray 14 is raised by the raising and lowering means 6 to soak the spit 12 in the liquid dough in the dough tray 14. The spit 12 is rotated continuously by the rotation control means 8 in this state so that the liquid dough may be caused to uniformly adhere to the outer circumference of the spit 12 (dough supply step).

After the liquid dough is supplied to the spit 12, the spit 12 is conveyed to the dough baking section 4 (in the housing 40) by the conveyance means 5, and the spit 12 is held in the housing 40 for a predetermined period of time while being rotated continuously. Consequently, the liquid dough is baked with heat from the upper heating device 41A and the lower heating device 41B, and the baked dough 11 is formed around the spit 12 (dough baking step). As the baking temperature at this time, about 300° C. to 365° C. is assumed in the case of producing Baumkuchen. However, it is preferred that the baking temperature be varied appropriately in accordance with the kind of liquid dough to be used.

After the baked dough is formed on the spit 12, the spit 12 is conveyed again to the dough supply section 3 by the conveyance means 5, and the dough tray 14 is raised by the raising and lowering means 6 to soak the spit 12 in the liquid dough in the dough tray 14. Then, the spit 12 is rotated continuously to cause the liquid dough to uniformly adhere onto the baked dough 11 around the outer circumference of the spit 12 (dough supply step). Then, again, the spit 12 is conveyed to the dough baking section 4 (in the housing 40) by the conveyance means 5, and the spit 12 is held in the housing 40 for a predetermined period of time while being rotated continuously. Consequently, the liquid dough is baked and the baked dough 11 is laminated on the baked dough 11 which has already been formed (dough baking step). A plurality of pieces of the baked dough 11 are laminated in the shape of a layer around the spit 12 by repeating the dough supply step and the dough baking step alternately.

During the process in which the plurality of pieces of baked dough 11 are laminated successively around the spit 12, the laminated baked dough 11 is subjected to press forming by the forming means 7 every time a predetermined number of pieces of the baked dough 11 are laminated. Specifically, after the liquid dough is baked, the forming tool 70 is pressed against the layered baked dough 11 around the spit 12 for a predetermined period of time (for example, 4 to 5 seconds) by the drive means 71 before new liquid dough is caused to adhere to the outer circumference of the spit 12 in the dough supply section 3. Thus, the baked dough 11 is subjected to a force in a state of being sandwiched between the forming surface 70A of the forming tool 70 and the outer circumferential surface of the spit 12, and hence a part of the outer circumferential surface of the baked dough 11 is formed along the shape (outer shape) of the outer circumferential surface of the spit 12. The formation of the baked dough 11 is performed at a plurality of portions in the circumferential direction of the outer circumferential surface of the baked dough 11 while the spit 12 is being rotated by a predetermined angle with the rotation control means 8.

For example, in the case where the outer shape of the baked dough 11 is formed into a polygonal shape (N-polygonal shape) as illustrated in FIGS. 22 to 24, the forming tool 70 having the forming surface 70A of a planar shape is pressed against the baked dough 11 for a predetermined period of time, every time the planar portion of the outer circumferential surface of the baked dough 11 is directed upward by intermittently rotating the spit 12 by 360°/N (for example, 90° in the case of a square shape; 72° in the case of a pentagonal shape; and 60° in the case of a hexagonal shape).

Further, in the case where the outer shape of the baked dough 11 is formed into a Japanese apricot shape as illustrated in FIG. 26, the forming tool 70 having the forming surface 70A of a predetermined convex curve shape is pressed against the baked dough 11 for a predetermined period of time, every time the concave groove portion of the outer circumferential surface of the baked dough 11 is directed upward by intermittently rotating the spit 12 by 72°.

Further, in the case where the outer shape of the baked dough 11 is formed into a star (five-rayed star or six-rayed star) shape as illustrated in FIGS. 27 and 28, the forming tool 70 having the forming surface 70A of a predetermined convex curve shape is pressed against the baked dough 11 for a predetermined period of time, every time the concave groove portion of the outer circumferential surface of the baked dough 11 is directed upward while the spit 12 is being rotated intermittently by 72° or 60°.

Further, in the case where the outer shape of the baked dough 11 is formed into a water clover shape as illustrated in FIG. 29, the forming tool 70 having the forming surface 70A of a predetermined convex curve shape is pressed against the baked dough 11 for a predetermined period of time, every time the concave groove portion of the outer circumferential surface of the baked dough 11 is directed upward while the spit 12 is being rotated intermittently by 45°.

Further, in the case where the outer shape of the baked dough 11 is formed into a bellflower shape as illustrated in FIG. 30, the forming tool 70 having the forming surface 70A of a predetermined convex curve shape is pressed against the baked dough 11 for a predetermined period of time, every time the concave groove portion of the outer circumferential surface of the baked dough 11 is directed upward while the spit 12 is being rotated intermittently by 72°.

Figure 25:
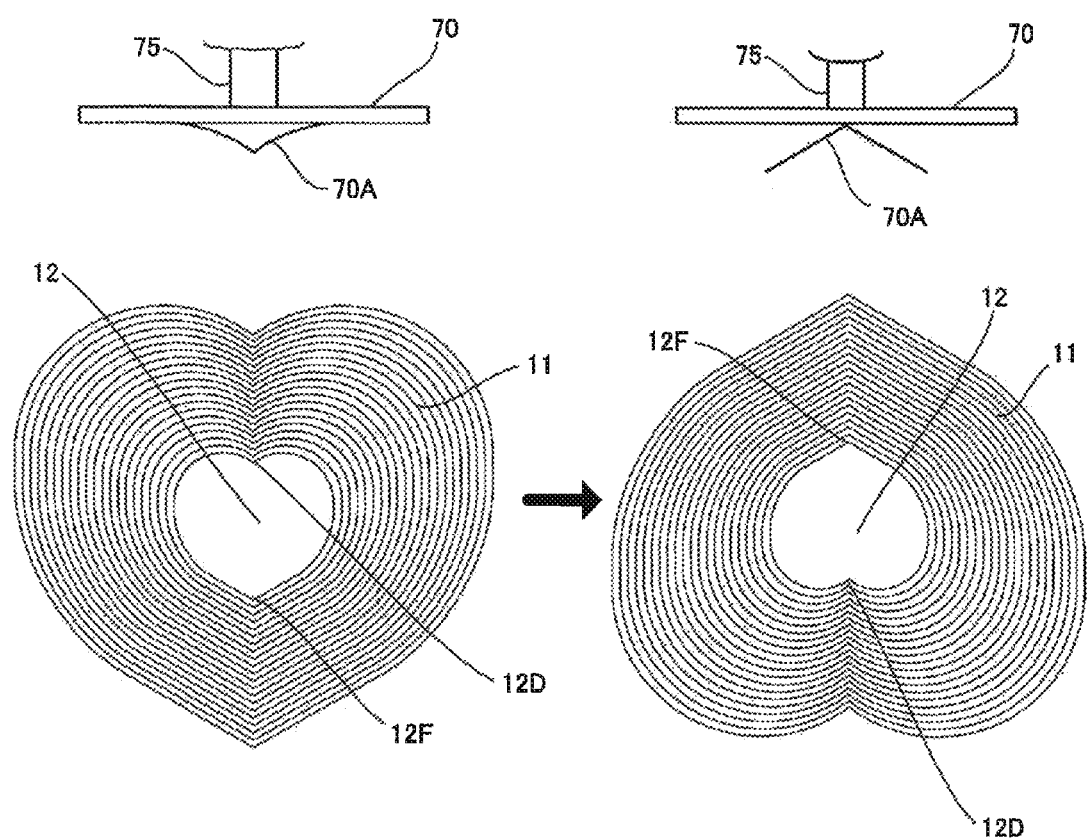
FIG. 25 is an explanatory view illustrating a method of forming layered food having a heart outer shape.

On the other hand, in the case where the outer shape of the baked dough 11 is formed into a heart shape as illustrated in FIG. 25, two kinds of the forming tools 70 are required to be used in the formation. In this case, for example, two kinds of the forming tools 70 are arranged so as to be adjacent to each other, and first, one of the forming tools 70 (on the left side of FIG. 25) having the forming surface 70A of a predetermined convex curve shape is pressed against the baked dough 11 for a predetermined period of time under a state in which the concave groove portion of the outer circumferential surface of the baked dough 11 is directed upward. After that, the spit 12 is slid to a position below the other of the forming tools 70 (on the right side of FIG. 25) by the conveyance means 5 and the spit 12 is rotated by 180° by the rotation control means 8. Thus, the forming tool 70 having the forming surface 70A of a concave curve shape is pressed against the baked dough 11 for a predetermined period of time under a state in which the pointed convex portion of the outer circumferential surface of the baked dough 11 is directed upward.

Figure 39:
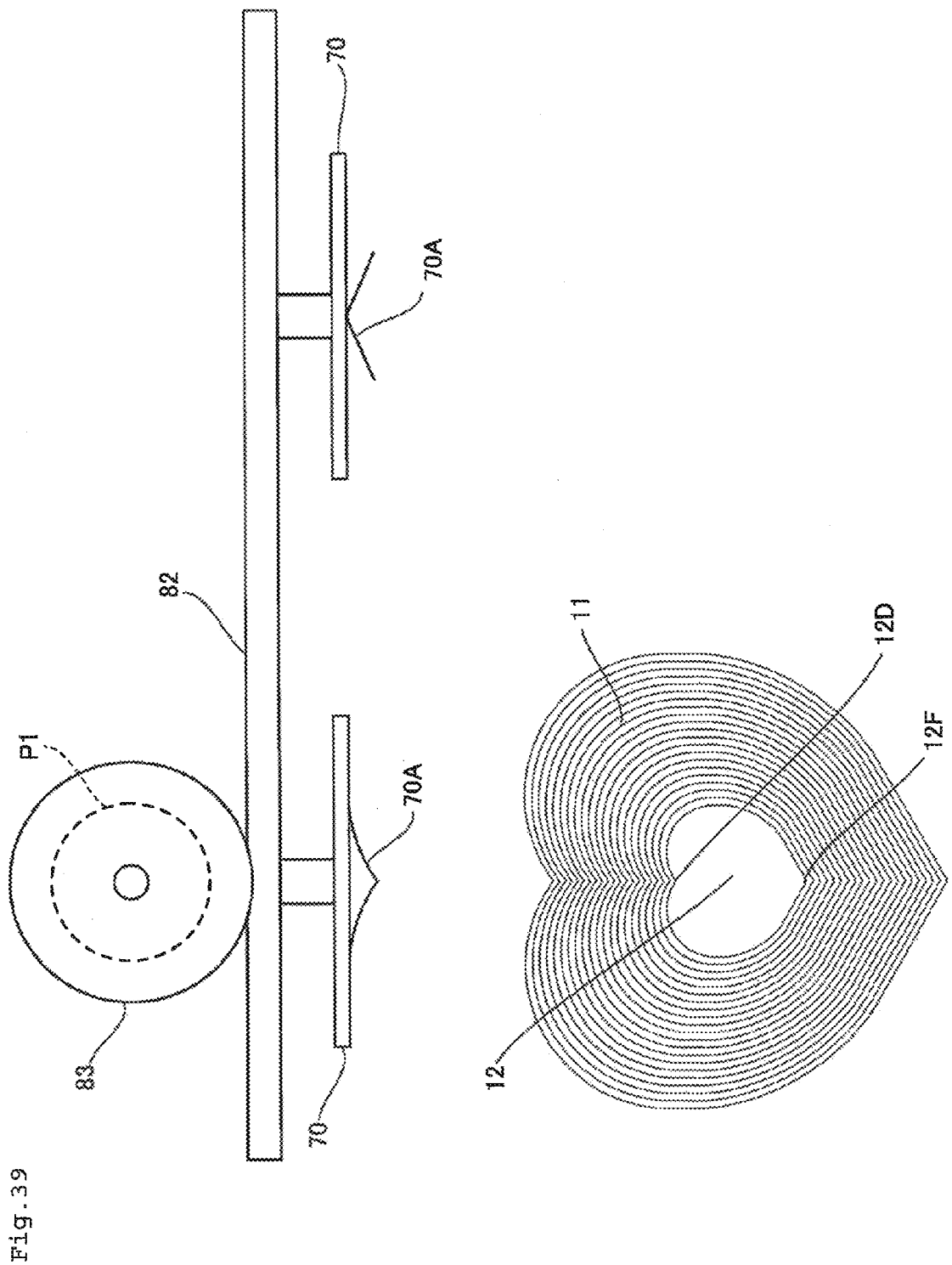
FIG. 39 is an explanatory view illustrating another method of forming layered food having a heart outer shape.
Figure 40:
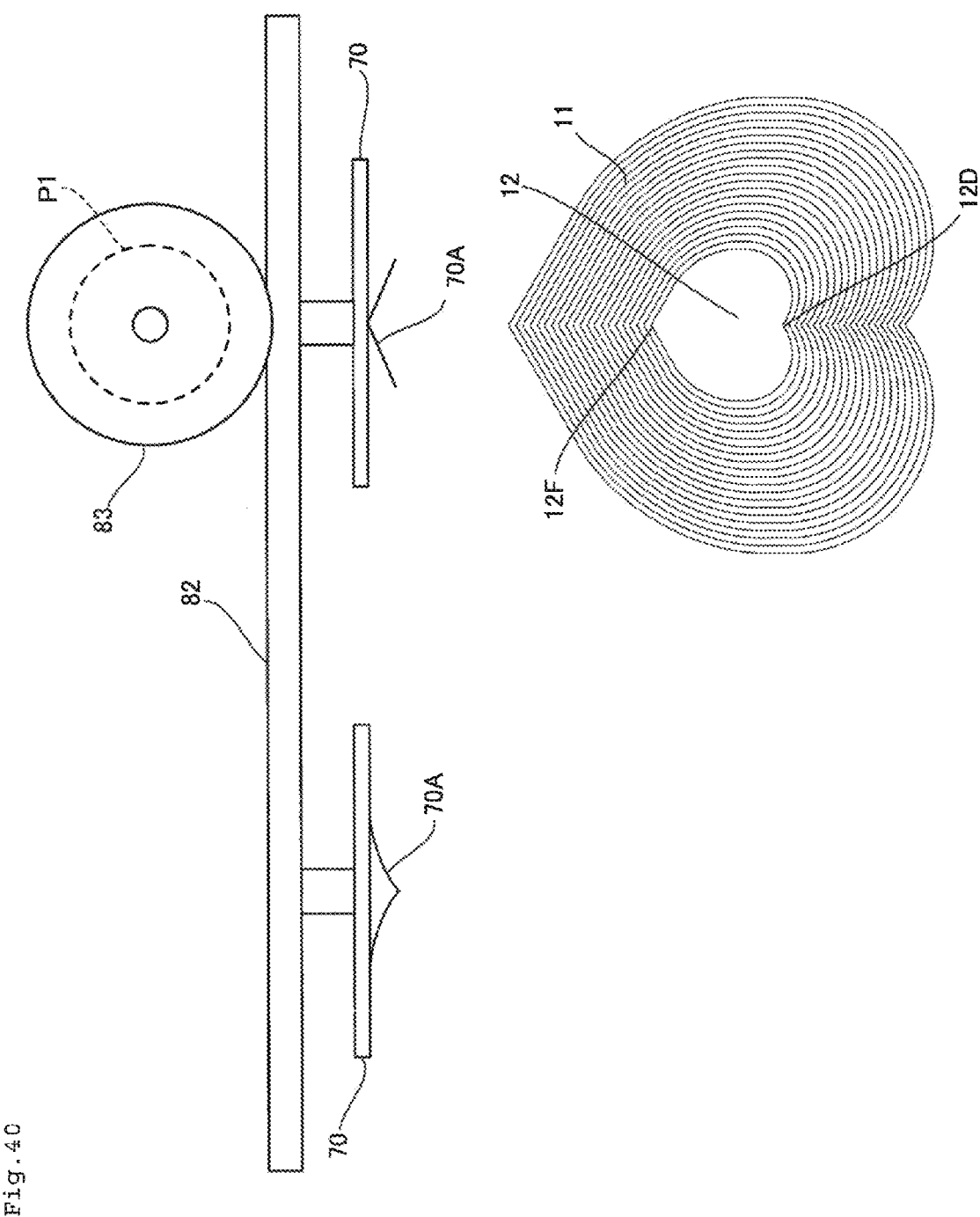
FIG. 40 is an explanatory view illustrating another method of forming layered food having a heart outer shape, which is continued from FIG. 39.

Note that, in the case where the outer shape of the baked dough 11 is formed into a heart shape, two kinds of the forming tools 70 may be moved with respect to the spit 12 without moving the spit 12. For example, as illustrated in FIGS. 39 and 40, two kinds of the forming tools 70 can be slid by a rack and pinion mechanism including a rack 82 and a pinion 83. Two kinds of the forming tools 70 are arranged so as to be adjacent to each other and coupled to the rack 82. The pinion 83 is rotationally driven by a rotary actuator P1, and the rack 82 is reciprocated linearly by controlling the rotary actuator P1, with the result that two kinds of the forming tools 70 are slid. In the example of FIGS. 39 and 40, first, under a state in which the concave groove portion of the outer circumferential surface of the baked dough 11 is directed upward, the forming tool 70 (on the left side of FIG. 39) having the forming surface 70a of a convex curve shape is moved above the baked dough 11 and pressed against the baked dough 11 for a predetermined period of time. After that, by rotating the spit 12 by 180° with the rotation control means 8, the pointed convex portion of the outer circumferential surface of the baked dough 11 is directed upward, and the rack 82 is slid so that the forming tool 70 (on the right side of FIG. 40) having the forming surface 70A of a concave curve shape may be moved above the baked dough 11. Then, the forming tool 70 is pressed against the baked dough 11 for a predetermined period of time, with the result that the outer shape of the baked dough 11 can be formed into a heart shape. Note that, the rack and pinion mechanism, the rotary actuator P1, and the like are mounted to the coupling member 79 and are moved up and down integrally by the drive means 71.

Figure 41:
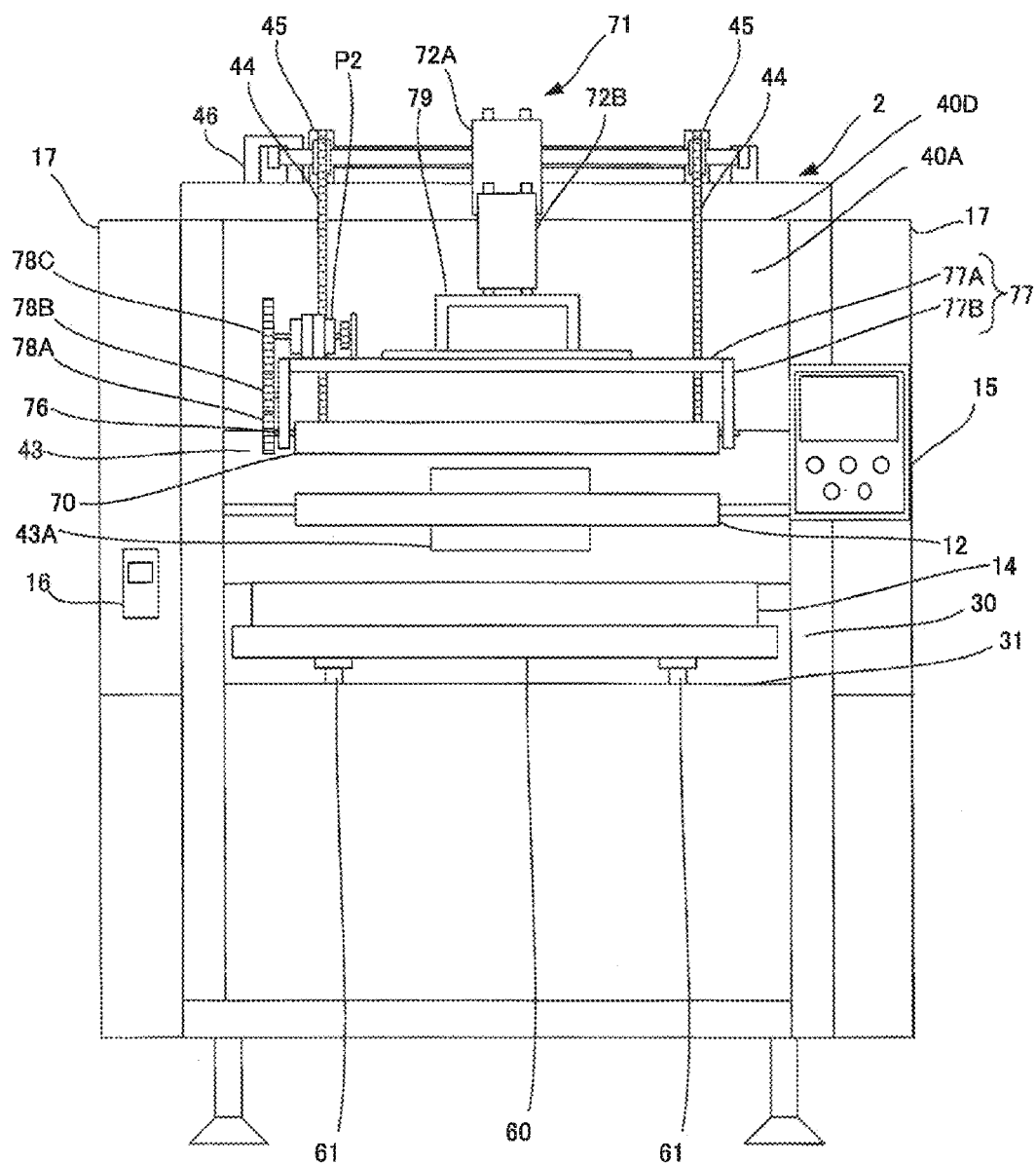
FIG. 41 is a schematic front view of the production device of FIG. 11 in the case of forming layered food having a heart outer shape.
Figure 42:
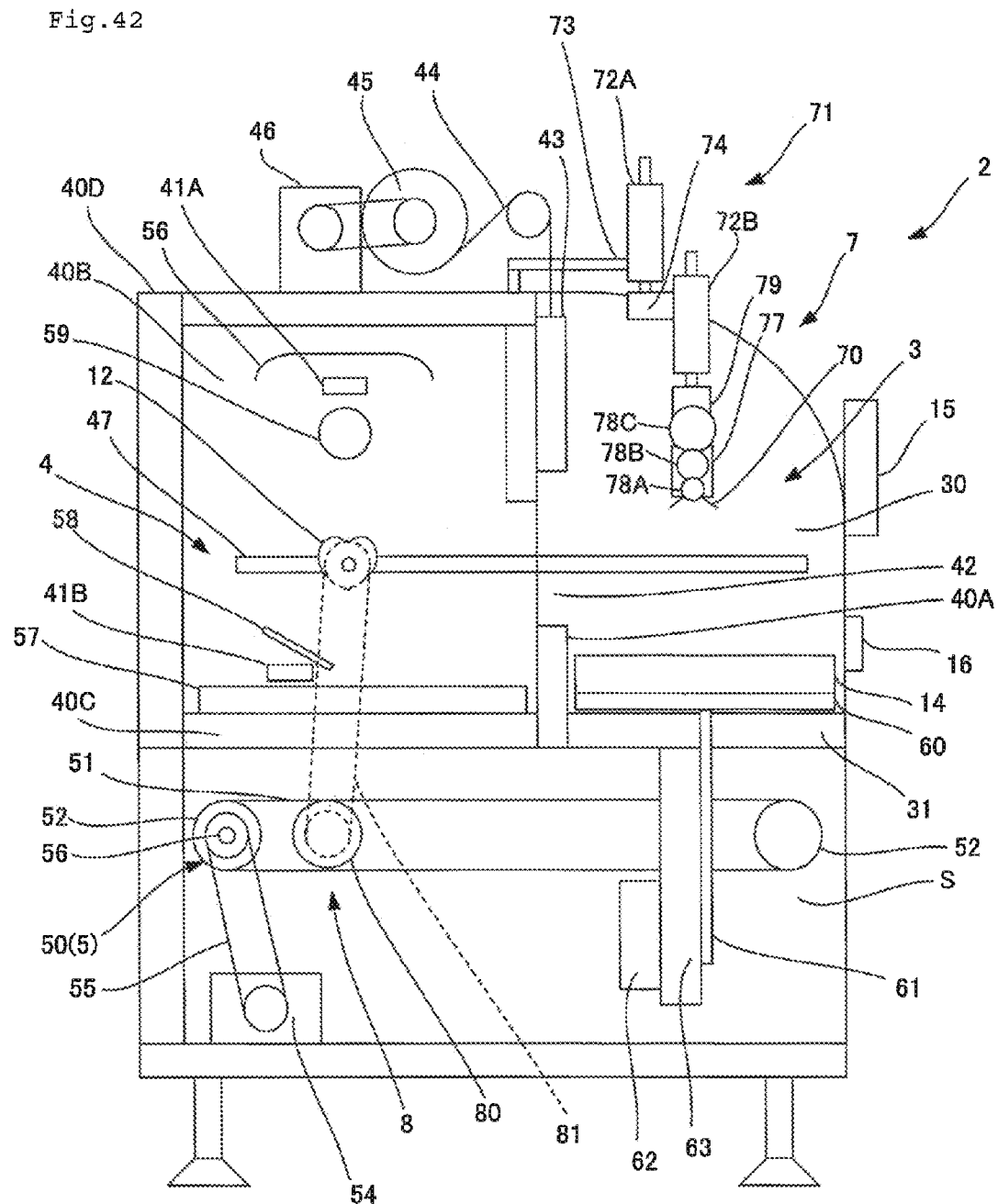
FIG. 42 is a schematic sectional view illustrating an internal structure of the production device of FIG. 41 viewed from a side surface side.
Figure 43:
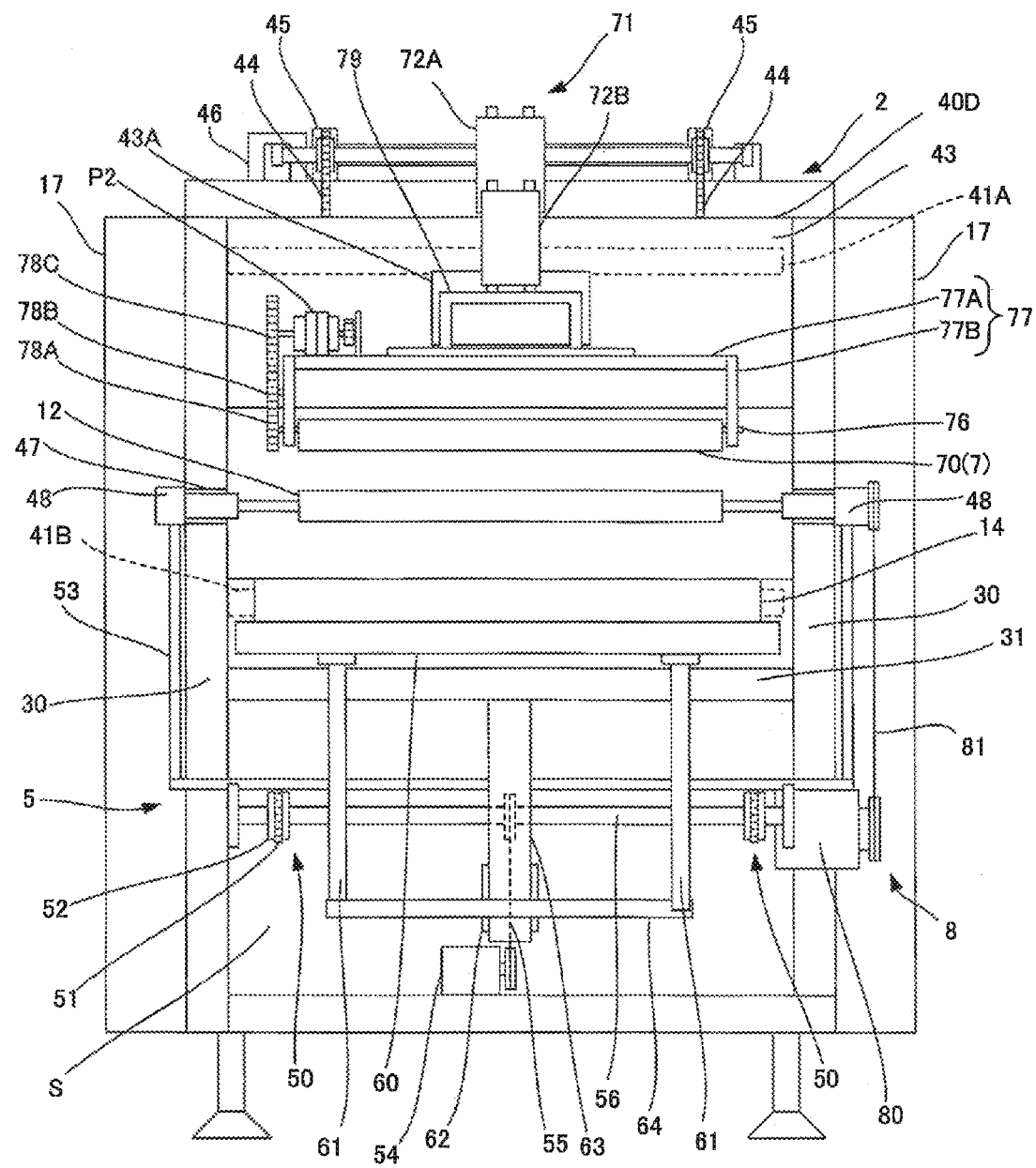
FIG. 43 is a schematic sectional view illustrating an internal structure of the production device of FIG. 41 viewed from a front surface side.
Figure 44:
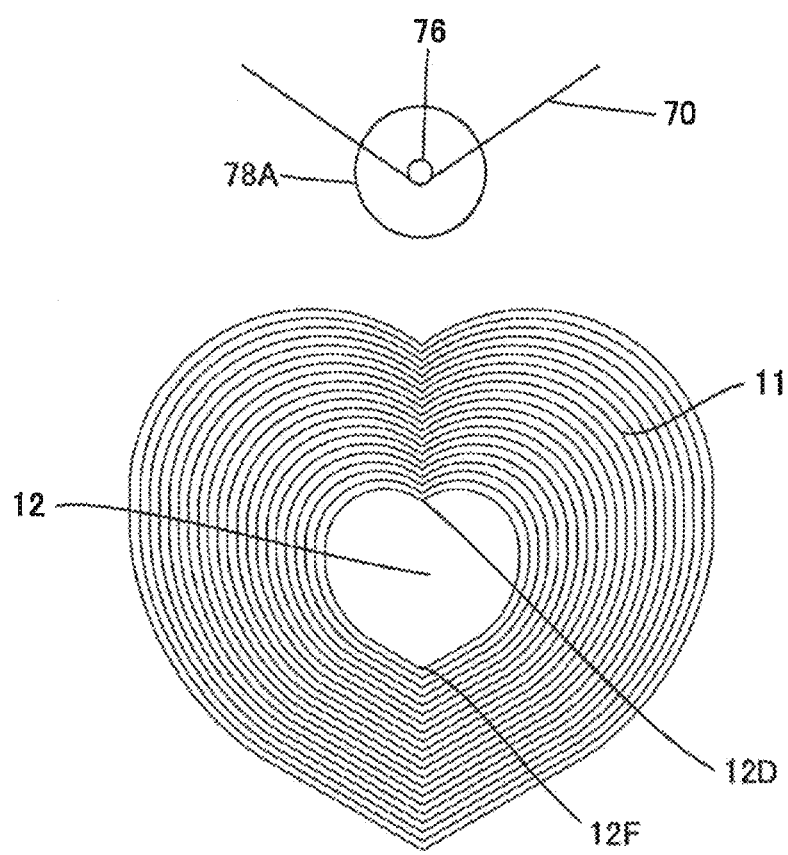
FIG. 44 is an explanatory view illustrating another method of forming layered food having a heart outer shape.
Figure 45:
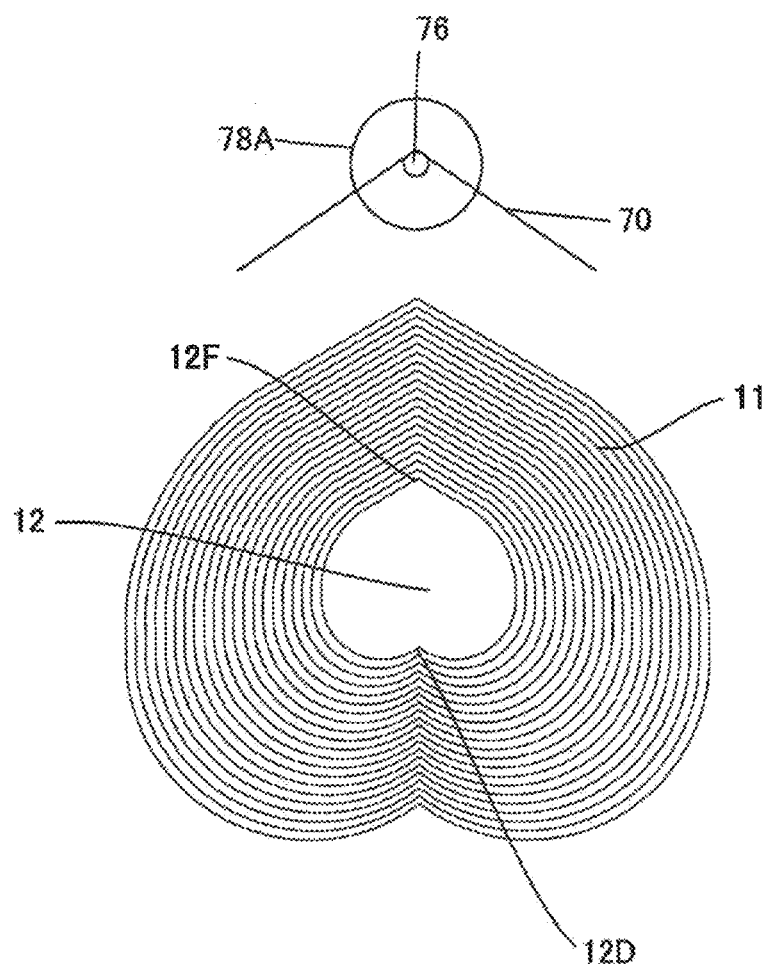
FIG. 45 is an explanatory view illustrating another method of forming layered food having a heart outer shape, which is continued from FIG. 44.

Further, for example, as illustrated in FIGS. 41 to 43, the outer shape of the baked dough 11 can also be formed into a heart shape through use of one kind of the forming tool 70. In the example of FIGS. 41 to 43, the forming tool 70 has a substantially L shape which is curved in a convex shape and pointed at a tip so as to conform to the shapes of the concave groove portion 12D and the convex portion 12F of the spit 12 of a heart shape (illustrated in FIG. 18). Shafts 76 in the shape of a round bar are mounted at both end positions in a length direction of inner surfaces of corner portions of the forming tool 70. The forming tool 70 is supported by a support frame 77 mounted to the coupling member 79. The support frame 77 includes an upper surface portion 77A fixed to the coupling member 79 and a pair of side surface portions 77B hanging from both side edges of the upper surface portion 77A, and the pair of shafts 76 of the forming tool 70 are rotatably supported by both the side surface portions 77B. A driven gear 78A is mounted on an end of one of the shafts 76 of the forming tool 70. In one side surface portion of the support frame 77, a transmission gear 78B is rotatably mounted above the shaft 76 so as to be meshed with the driven gear 78A. Further, a rotary actuator P2 is fixed to the upper surface portion 77A of the support frame 77, and a drive gear 78C which is meshed with the transmission gear 78B is mounted on a rotation shaft (not shown) of the rotary actuator P2. In the example of FIGS. 41 to 43, the rotation drive force of the rotary actuator P2 is transmitted to the transmission gear 78B by the drive gear 78C and is further transmitted from the transmission gear 78B to the driven gear 78A fixed to the shaft 76 of the forming tool 70, with the result that the forming tool 70 is rotated. Therefore, first, as illustrated in FIG. 44, under the condition that the concave groove portion of the outer circumferential surface of the baked dough 11 is directed upward, the forming tool 70 is rotated so as to become convex downward, and the forming tool 70 is pressed against the baked dough 11 by the drive means 71 for a predetermined period of time. After that, as illustrated in FIG. 45, the spit 12 is rotated by 180° with the rotation control means 8 so that the pointed convex portion of the outer circumferential surface of the baked dough 11 is directed upward, and the forming tool 70 is also rotated by 180° so as to become convex upward. Then, the forming tool 70 is pressed against the baked dough 11 by the drive means 71 for a predetermined period of time. Thus, the outer shape of the baked dough 11 can be formed into a heart shape.

As described above, the forming tool 70 is pressed against the outer circumferential surface of the baked dough 11 a plurality of times while rotating the spit 12, thereby uniformly forming the outer circumferential surface of the baked dough 11 during one formation step. Thus, the outer shape of the baked dough 11 can be formed into a desired shape conforming to the outer shape of the spit 12.

The above-mentioned formation step is performed every time the dough supply step and the dough baking step are performed a predetermined number of times, thereby laminating a predetermined number of layers (for example, 24 to 30 layers) of the baked dough 11 around the spit 12. Thus, the layered food 1 with the outer shape thereof formed into a desired shape can be produced. Note that, the frequency of performing the formation step can be appropriately varied in accordance with the outer shape of the layered food 1 to be produced, and the formation step may be performed, in accordance with the outer shape of the layered food 1, every time the dough supply step and the dough baking step are performed, or for example, once every two to five times the dough supply step and the dough baking step are performed. Note that, when the formation step is performed as needed every time the dough supply step and the dough baking step are performed, the outer circumferential surface of the baked dough 11 is subjected to press forming excessively to stiffen the baked dough 11, and there is a risk in that the produced layered food 11 may not be finished with puffy food texture. Therefore, it is preferred that the formation step be performed at an appropriate interval depending on the outer shape of the layered food 1, but there is no problem even when the formation step is performed every time the dough supply step and the dough baking step are performed.

FIGS. 31 to 35 are plan views of the layered food 1 (Baumkuchen) produced by the above-mentioned production device 2 and the above-mentioned product ion method, respectively having an outer shape and an inner hole outer shape formed into a square shape, a pentagonal shape, a hexagonal shape, a heart shape, and a Japanese apricot shape. In the layered food 1 (Baumkuchen) of any shape, 24 layers of the baked dough 11 are laminated. Further, in the layered food 1 (Baumkuchen) of a square shape, a pentagonal shape, a hexagonal shape, and a Japanese apricot shape, the formation step is performed once every four times the dough supply step and the dough baking step are performed. In the layered food 1 (Baumkuchen) of a heart shape, the formation step is performed once every two times the dough supply step and the dough baking step are performed.

As illustrated in FIGS. 31 to 35, when the layered food 1 is produced by the production device 2 and the production method of the present invention, the outer shape of the layered food 1 and the outer shape of the inner hole 10 can be formed into a shape different from a circular shape, and it can be confirmed that all the layers of the baked dough 11 ranging from the innermost layer of the baked dough 11 to the outermost layer of the baked dough 11 are laminated so as to surround the entire circumference of the hole 10 to exhibit a concentric pattern. Thus, according to the present invention, the layered food 1 can be produced, in which the outer shape and the shape of the inner hole 10 are formed into various shapes such as a polygonal shape, a heart shape, a star shape, and a Japanese apricot shape, instead of a circular shape, and hence the external appearance of the layered food 1 can be rendered full of uniqueness and unexpectedness. As a result, the layered food 1 can have strong impression on consumers and arouse consumers' eagerness to buy the product.

One embodiment of the present invention has been described above. However, the specific aspects of the present invention are not limited to the above-mentioned embodiment. For example, in the production device 2 of the above-mentioned embodiment, the baked dough 11 formed around the spit 12 is subjected to press forming by pressing the forming tool 70 against the baked dough 11 from immediately above the baked dough 11. However, the baked dough 11 can be subjected to press forming by pressing the forming tool 70 against the baked dough 11 from immediately below the baked dough 11, from a right, left, front, or back side thereof, or from any oblique direction. Further, a plurality of the forming tools 70 may be arranged so as to subject the outer circumferential surface of the baked dough 11 to press forming in a plurality of portions at a time.

Figure 36:
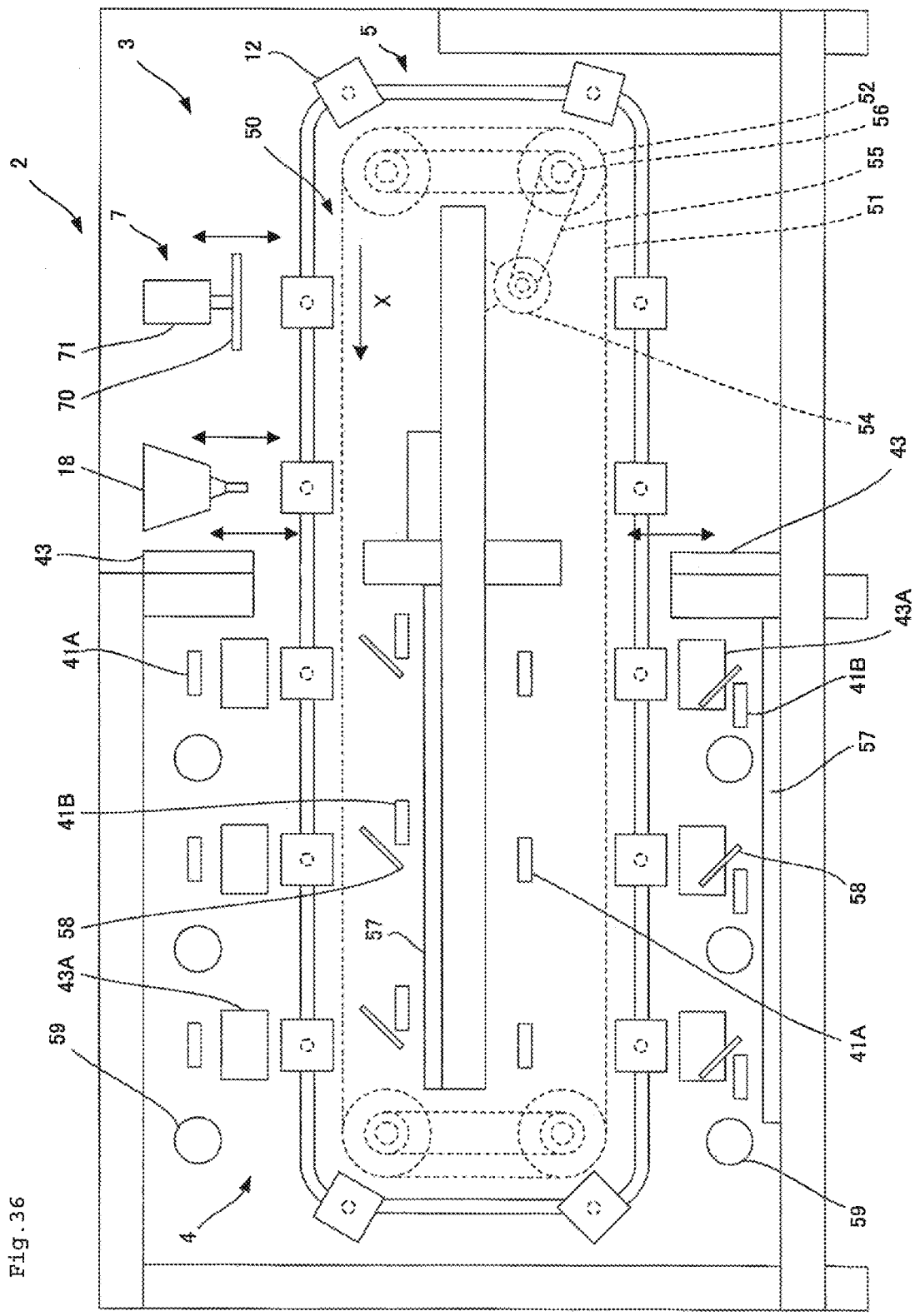
FIG. 36 is an explanatory view illustrating a schematic configuration of a production device according to another embodiment of the present invention.
Figure 37:
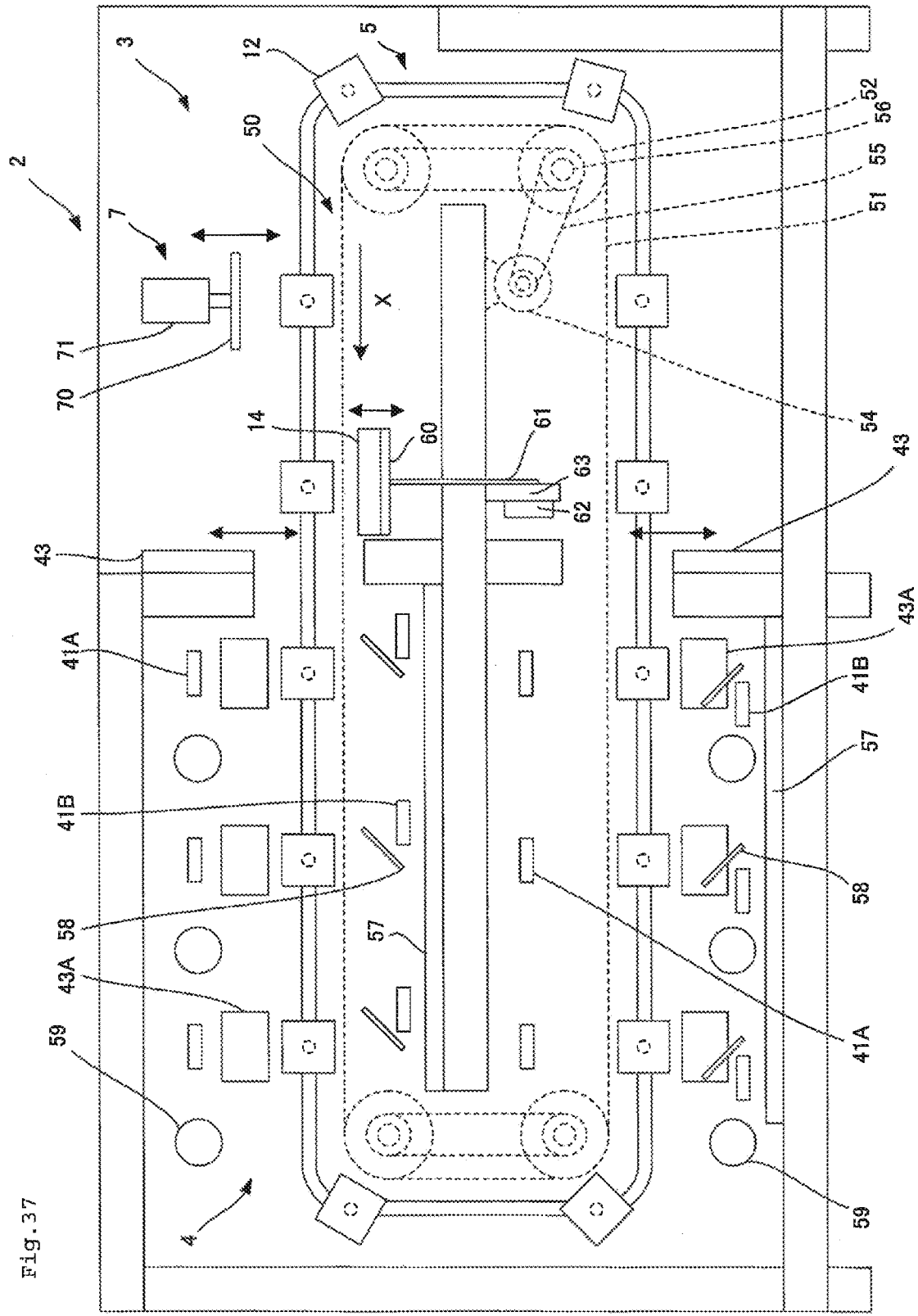
FIG. 37 is an explanatory view illustrating a schematic configuration of a modified example of the production device of FIG. 36.
Figure 38:
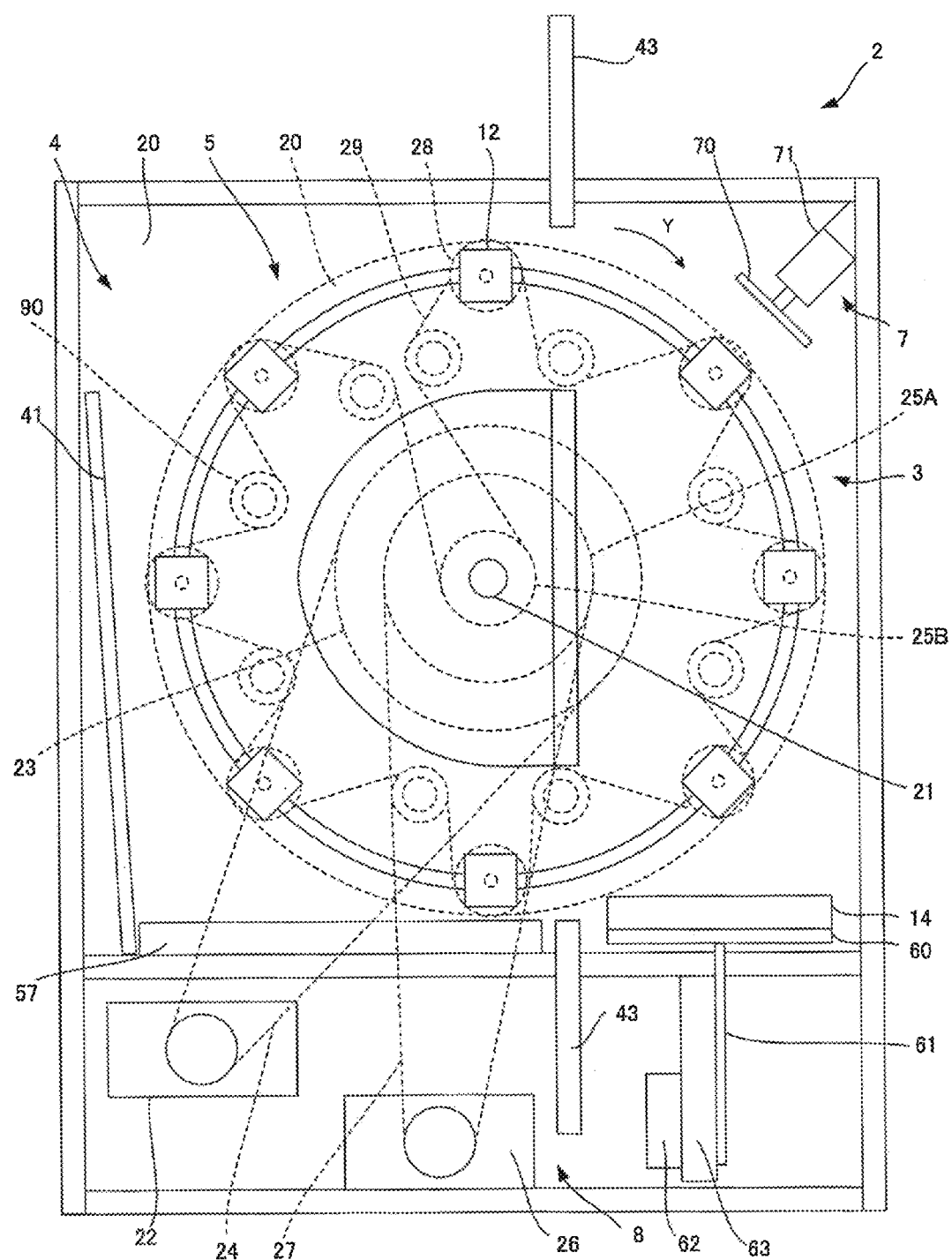
FIG. 38 is an explanatory view illustrating a schematic configuration of a production device according to another embodiment of the present invention.

Further, in the production device 2 of the above-mentioned embodiment, one layered food 1 is produced by conveying one spit 12 to the dough supply section 3 and the dough baking section 4. However, as illustrated in FIGS. 36 to 38, a multiple production device 2 may be used, which is capable of producing a plurality of pieces of the layered food 1 at a time by conveying a plurality of the spits 12 to the dough supply section 3 and the dough baking section 4. Note that, the basic configuration of the production device 2 illustrated in FIGS. 36 to 38 is similar to that of the production device 2 of the above-mentioned embodiment illustrated in FIGS. 11 to 14, and the description thereof is omitted by denoting the corresponding components with the same reference symbols.

In the production device 2 illustrated in FIG. 36, the pair of right and left chain conveyers 50 are provided as the conveyance means 5 for conveying the spits 12. Each chain conveyer 50 is tensioned by four conveyance pulleys 52 in two upper and lower stages around which the endless conveyance chain 51 is arranged in a front-back direction, and conveyance passages in two upper and lower stages are provided. The conveyance pulleys 52 of the opposed chain conveyers 50 are coupled to each other through the coupling shaft 56 so as to rotate in synchronization. A sprocket fixed to the coupling shaft 56 of the predetermined conveyance pulley 52 and a sprocket fixed to the rotation shaft of the conveyance motor 54 are coupled to each other through the chain 55. When the conveyance pulleys 52 are rotated in a forward/reverse direction by the conveyance motor 54, the pair of right and left conveyance chains 51 travel. A plurality of pairs of bearings (not shown) are fixed to the pair of right and left conveyance chains 51, and both ends of the spit 12 are supported by each bearing, with the result that a plurality of (14 in the illustrated example) the spits 12 turn around two upper and lower stages of the conveyance passages in an arrow X direction and are conveyed between the dough supply section 3 and the dough baking section 4. The upper and lower communication passages between the dough supply section 3 and the dough baking section 4 are respectively opened and closed by the shutter 43 which moves up and down. Further, each spit 12 is rotatably controlled by the rotation control means (not shown), and is conveyed in the arrow X direction by the conveyance means 5 and rotationally driven continuously and intermittently by a predetermined angle in a forward/reverse direction with the rotation control means.

Figure 46:
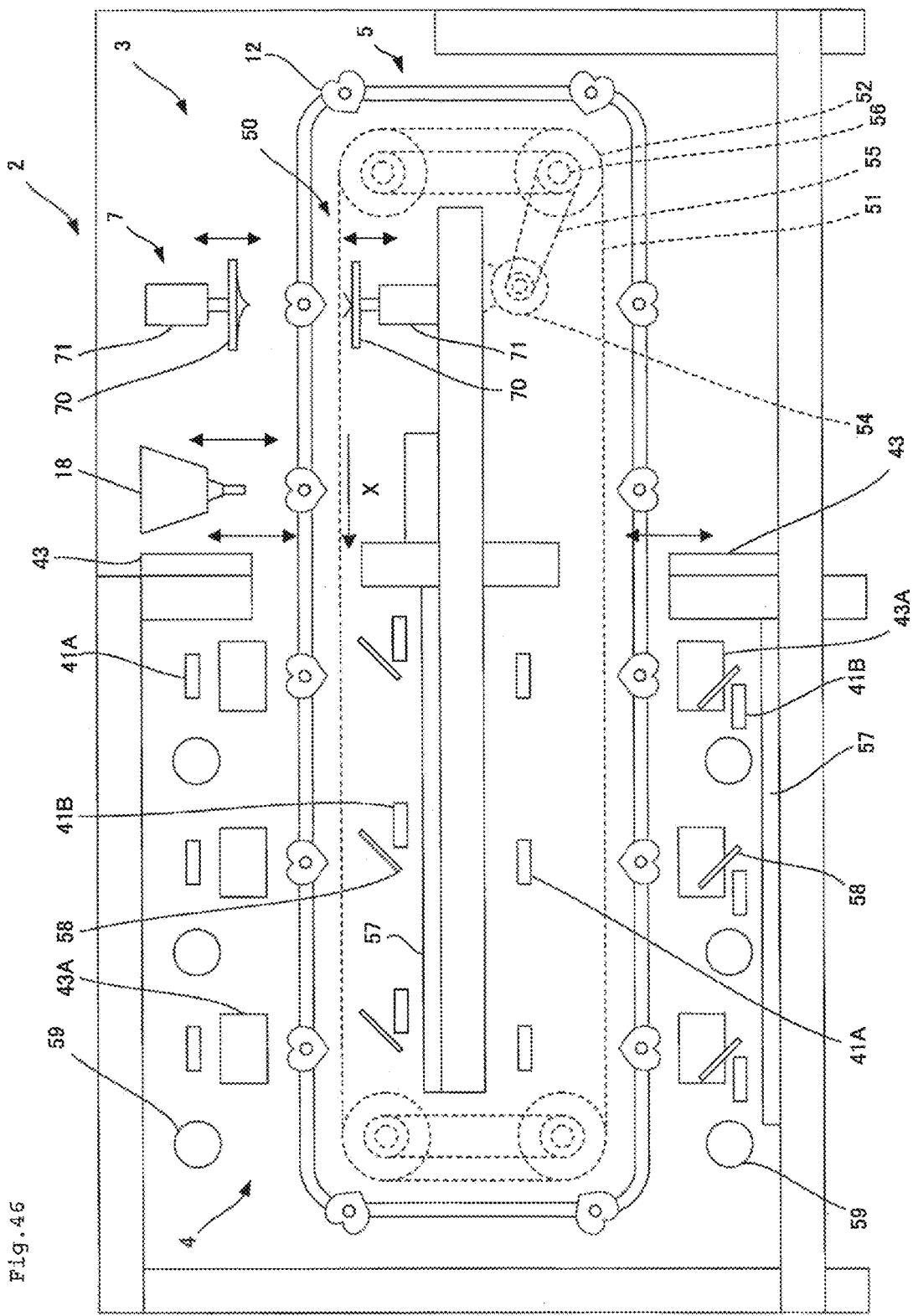
FIG. 46 is an explanatory view illustrating a schematic configuration of the production device of FIG. 36 in the case of forming layered food having a heart outer shape.

The dough supply section 3 includes the forming means 7 including the forming tool 70 described above and the drive means 71 for pressing the forming tool 70 against the outer circumferential surface of the baked dough 11 to be laminated around the spit 12 by moving up and down the forming tool 70. Note that, in the case where the outer shape of the baked dough 11 is formed into a heart shape, it is necessary to form the outer shape through use of two kinds of the forming tools 70 (illustrated in FIG. 25). Therefore, as illustrated in FIG. 46, two kinds of the forming tools 70 are provided so that the heart-shaped spit 12 is arranged therebetween, and each forming tool 70 can be moved up and down by the drive means so that each forming tool 70 is pressed against the outer circumferential surface of the baked dough 11 to be laminated around the spit 12. Further, in the dough supply section 3, a nozzle 18 for supplying liquid dough to the outer circumference of the spit 12 by ejecting the liquid dough downward is provided at a position on a downstream side of the forming means 7 in the conveyance direction of the spit 12. The nozzle 18 can be raised and lowered in an up-down direction by the raising and lowering means (not shown).

The dough baking section 4 includes a plurality of (six in the illustrated example) baking regions capable of baking the liquid dough, and the spit 12 is delivered to the dough supply section 3 after being successively conveyed to the plurality of baking regions of the dough baking section 4. In each dough baking region of the dough baking section 4, the upper and lower heating devices 41A, 41B, the water storage container 57, and the cover plate 58 are provided. Further, in the dough baking section 4, the window 43A for visually confirming the inside therethrough and the illumination means 59 for illuminating the inside are appropriately provided.

In the production device 2 illustrated in FIG. 36, first, the nozzle 18 is lowered by the raising and lowering means (not shown) so as to be brought close to the spit 12 conveyed to a position below the nozzle 18. Then, the spit 12 is rotated continuously or intermittently by the rotation control means (not shown) to cause the liquid dough ejected from the nozzle 18 to uniformly adhere to the outer circumference of the spit 12 (dough supply step).

After the liquid dough is supplied to the spit 12, the spit 12 is conveyed to a first baking region of the dough baking section 4 by the conveyance means 5 while the spit 12 is being rotated continuously. While the spit 12 is held in the first baking region for a predetermined period of time, the liquid dough is supplied by the nozzle 18 to the spit 12 on an immediately downstream side of the spit 12 held in the first baking region. Then, the spit 12 on the immediately downstream side is conveyed to the first baking region of the dough baking section 4 by the conveyance means 5, and the spit 12 on an immediately upstream side is conveyed to a second baking region of the dough baking section 4. This step is repeated to cause the spit 12 to pass through all the baking regions of the dough baking section 4, and thus the liquid dough is baked (dough baking step).

When the spit 12 delivered from the dough baking section 4 is conveyed to a position below the forming means 7, the baked dough 11 formed around the spit 12 is subjected to press forming by the forming means 7 while the spit 12 is being rotated intermittently by a predetermined angle (forming step). Thus, the outer shape of the baked dough 11 can be formed into a desired shape along the outer shape of the spit 12.

Then, the spit 12 is again conveyed to the position below the nozzle 18, and the liquid dough is caused to uniformly adhere onto the baked dough 11 around the outer circumference of the spit 12. After that, the spit 12 is conveyed to each baking region of the dough baking section 4 to bake the liquid dough, with the result that the baked dough 11 is laminated on the baked dough 11 which has already been formed. The above-mentioned step is repeatedly performed, and the baked dough 11 is laminated around the spit 12 by a predetermined number of layers (for example, 24 to 30 layers) so that the layered food 1 may be produced. Note that, it is preferred to subject the baked dough 11 to press forming by the forming means 7 every time a predetermined number of pieces of the baked dough 11 are laminated around the spit 12 in accordance with the outer shape of the layered food 1 in the same way as in the production device 2 of the above-mentioned embodiment.

Figure 47:
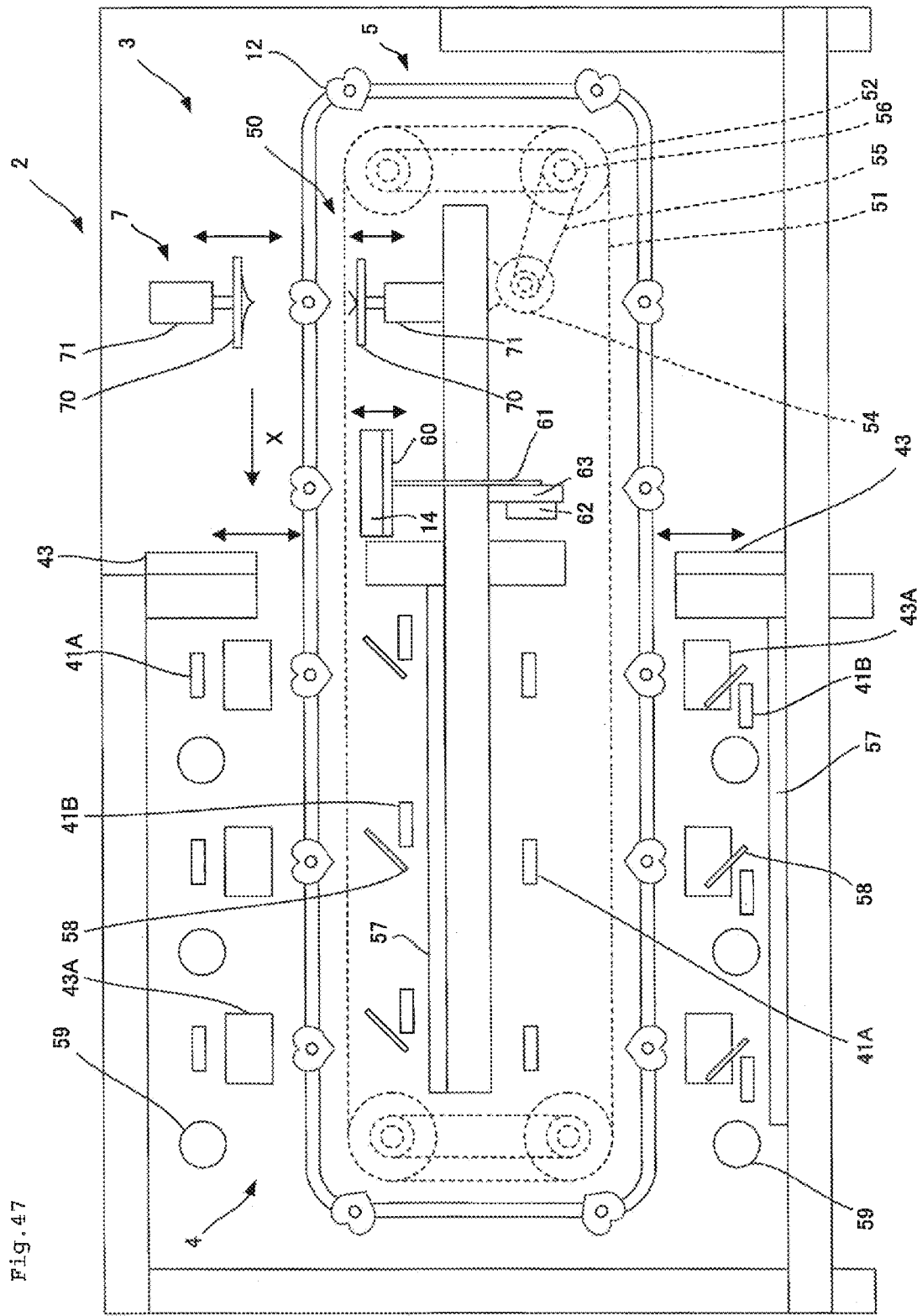
FIG. 47 is an explanatory view illustrating a schematic configuration of the production device of FIG. 37 in the case of forming layered food having a heart outer shape.

The production device 2 illustrated in FIG. 37 is a modified example of the production device 2 illustrated in FIG. 36, and is the same as the production device 2 illustrated in FIG. 36 except for only the configuration for supplying liquid dough to the outer circumference of the spit 12. Therefore, the detailed description of the remaining configuration is omitted by denoting the components with the same reference symbols as those in FIG. 36. In the production device 2 illustrated in FIG. 37, liquid dough is not supplied to the outer circumference of the spit 12 by the nozzle 18 but the dough tray 14 storing liquid dough is placed in the dough supply section 3 in the same way as in the production device 2 of the above-mentioned embodiment illustrated in FIGS. 11 to 14. The dough tray 14 is supported by the support platform 60, and the support rod 61 fixed to a lower surface of the support platform 60 is moved up and down by the motor 62 and the rack and pinion mechanism 63, with the result that the dough tray 14 is raised and lowered in an up-down direction. In the production device 2 illustrated in FIG. 37, the liquid dough can be caused to uniformly adhere to the outer circumference of the spit 12 by raising the dough tray 14 and continuously rotating the spit 12 under a state in which the spit 12 is soaked in the liquid dough. Note that, in the case where the outer shape of the baked dough 11 is formed into a heart shape in the production device 2 illustrated in FIG. 37, it is also necessary to form the outer shape through use of two kinds of the forming tools 70 (illustrated in FIG. 25). Therefore, as illustrated in FIG. 47, two kinds of the forming tools 70 are provided so that the heart-shaped spit 12 is arranged therebetween, and each forming tool 70 can be moved up and down by the drive means so that each forming tool 70 is pressed against the outer circumferential surface of the baked dough 11 to be laminated around the spit 12.

Next, the production device 2 illustrated in FIG. 38 includes, as the conveyance means 5 for conveying the spit 12, a pair of right and left circular rotation drums 20, a coupling shaft 21 for coupling both the rotation drums 20 so as to rotate the rotation drums in synchronization, and a drive motor 22 serving as a drive source for rotating the rotation drums 20. Both ends of the coupling shaft 21 are supported by bearings (not shown) provided at a pair of right and left side walls 20 for defining the dough supply section 3 and the dough baking section 4. A sprocket 23 fixed to the coupling shaft 21 and a sprocket fixed to a rotation shaft of the drive motor 22 are coupled to each other through a chain 24, and both the rotation drums 20 are rotated in an arrow Y direction when the coupling shaft 21 is rotated by the drive motor 22. Both ends of the spit 12 are supported by the pair of right and left rotation drums 20 through intermediation of bearings (not shown), and a plurality of (eight in the illustrated example) spits 12 are provided in the circumferential direction of the rotation drums 20.

Further, two large and small sprockets 25A, 25B are loosely fitted to the coupling shaft 21 in parallel. One sprocket 25A is coupled through intermediation of a chain 27 to a sprocket fixed to a rotation shaft of a rotation motor 26 forming the rotation control means 8 for rotating each spit 12 and controlling the rotation thereof. The other sprocket 25B is coupled through intermediation of a chain 29 to a sprocket 28 fixed to one end of each spit 12. Note that, in the figure, there is provided a tension sprocket 90 for looping, under tension, the chain 29 bent in the shape of a star, and the tension sprocket 90 is axially supported by the rotation drums 20.

Each spit 12 is rotated (revolved) in the arrow Y direction integrally with the rotation drums 20 by the conveyance means 5 and conveyed between the dough supply section 3 and the dough baking section 4. Further, the spit 12 is rotated (turned around on its own axis) continuously and intermittently by a predetermined angle in a forward/reverse direction through the respective chains 27, 29 by the drive of the rotation motor 26. The upper and lower communication passages between the dough supply section 3 and the dough baking section 4 are respectively opened and closed by the shutter 43 which moves up and down.

Figure 48:
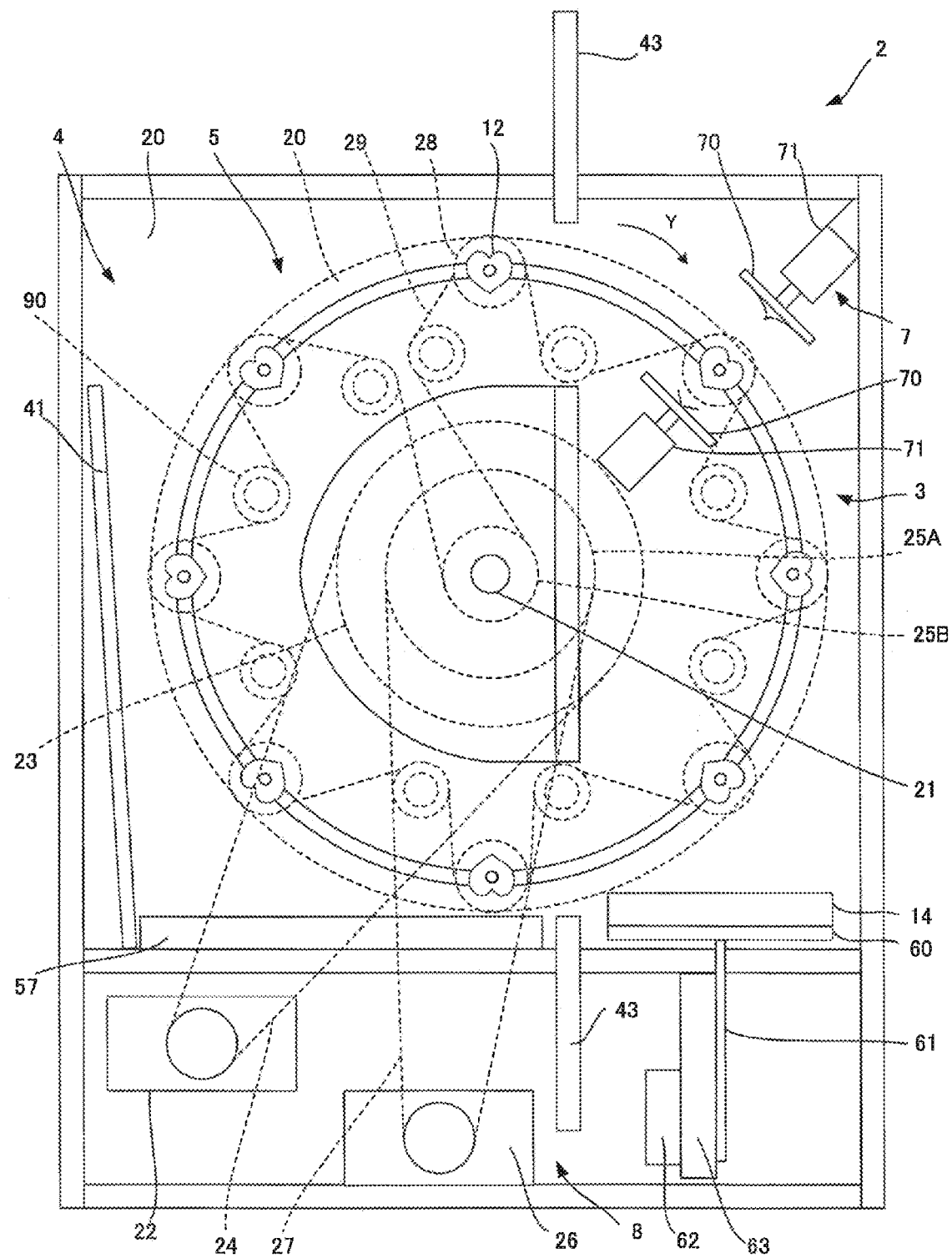
FIG. 48 is an explanatory view illustrating a schematic configuration of the production device of FIG. 38 in the case of forming layered food having a heart outer shape.

The dough supply section 3 includes the forming means 7 including the forming tool 70 described above and the drive means 71 for pressing the forming tool 70 against the outer circumferential surface of the baked dough 11 to be laminated around the spit 12 by moving up and down the forming tool 70. Note that, in the case where the outer shape of the baked dough 11 is formed into a heart shape, it is necessary to form the outer shape through use of two kinds of the forming tools 70 (illustrated in FIG. 25). Therefore, as illustrated in FIG. 48, two kinds of the forming tools 70 are provided so that the heart-shaped spit 12 is arranged therebetween, and each forming tool 70 can be moved up and down by the drive means so that each forming tool 70 is pressed against the outer circumferential surface of the baked dough 11 to be laminated around the spit 12. Further, in the dough supply section 3, the dough tray 14 is supported so as to be raised and lowered in an up-down direction by the raising and lowering means 6 at a position on a downstream side of the forming means 7 in the conveyance direction of the spit 12.

In the same way as in the production device 2 of the above-mentioned embodiment illustrated in FIGS. 11 to 14, the dough tray 14 is supported by the support platform 60, and the support rod 61 fixed to a lower surface of the support platform 60 is moved up and down by the motor 62 and the rack and pinion mechanism 63, with the result that the dough tray 14 is raised and lowered in an up-down direction. When the dough tray 14 is raised, and the spit 12 is rotated continuously in a state of being soaked in the liquid dough, the liquid dough can be caused to uniformly adhere to the outer circumference of the spit 12.

The dough baking section 4 includes a plurality of (five in the illustrated example) baking regions capable of baking the liquid dough, and the spit 12 is delivered to the dough supply section 3 after being successively conveyed to the plurality of baking regions of the dough baking section 4. The dough baking section 4 includes the heating device 41 and the water storage container 57. Further, in the dough baking section 4, a window (not shown) for visually confirming the inside therethrough and illumination means (not shown) for illuminating the inside are appropriately provided.

In the production device 2 illustrated in FIG. 38, first, the dough tray 14 is raised by the raising and lowering means (not shown) to soak the spit 12 at a predetermined position in liquid dough. Then, the liquid dough is caused to uniformly adhere to the outer circumference of the spit 12 by rotating the spit 12 continuously with the rotation control means 8 (dough supply step).

After the liquid dough is supplied to the spit 12, the spit 12 is conveyed to a first baking region of the dough baking section 4 by the conveyance means 5 while the spit 12 is being rotated continuously. While the spit 12 is held in the first baking region for a predetermined period of time, the spit 12 on an immediately downstream side of the spit 12 held in the first baking region is soaked in the liquid dough in the dough tray 14 to supply the liquid dough thereto. Then, the spit 12 on the immediately downstream side is conveyed to the first baking region of the dough baking section 4 by the conveyance means 5, and the spit 12 on an immediately upstream side is conveyed to a second baking region of the dough baking section 4. This step is repeated to cause the spit 12 to pass through all the baking regions of the dough baking section 4, and thus the liquid dough is baked (dough baking step).

When the spit 12 delivered from the dough baking section 4 is conveyed to the forming means 7, the baked dough 11 formed around the spit 12 is subjected to press forming by the forming means 7 while the spit 12 is being rotated intermittently by a predetermined angle (forming step). Thus, the outer shape of the baked dough 11 can be formed into a desired shape along the outer shape of the spit 12.

Then, the spit 12 is again conveyed to the dough tray 14, and the liquid dough is caused to uniformly adhere onto the baked dough 11 around the outer circumference of the spit 12. After that, the spit 12 is conveyed to each baking region of the dough baking section 4 to bake the liquid dough, with the result that the baked dough 11 is laminated on the baked dough 11 which has already been formed. The above-mentioned step is repeatedly performed, and the baked dough 11 is laminated around the spit 12 by a predetermined number of layers (for example, 24 to 30 layers) so that the layered food 1 may be produced. Note that, it is preferred to subject the baked dough 11 to press forming by the forming means 7 every time a predetermined number of pieces of the baked dough 11 are laminated around the spit 12 in the same way as in the production device 2 of the above-mentioned embodiment.

By constructing the multiple production device 2 as in the embodiments of FIGS. 36 to 38, a plurality of pieces of the layered food 1 can be produced at a time, and hence the productivity of the layered food 1 can be enhanced.

Note that, in the foregoing description, there has been described a method of producing the layered food 1 by the production device 2 according to the present invention so that the outer shape thereof and the outer shape of the inner hole 10 are not circular. However, needless to say, the traditional cylindrical layered food 1 can also be produced by the production device 2 so that the outer shape thereof and the outer shape of the inner hole 10 are circular.

REFERENCE SIGNS LIST 1 layered food
2 production device
3 dough supply section
4 dough baking section
5 conveyance means
6 raising and lowering means
8 rotation control means
10 hole
11 baked dough
12 spit
14 dough tray
43 shutter
57 water storage container
70 forming tool
71 drive means

The invention claimed is:

1. A production device for layered food to be produced by laminating a plurality of pieces of baked dough in a shape of a layer so as to surround an inner hole, the production device comprising:
a dough supply section for causing liquid dough to adhere to an outer circumference of a spit;
a dough baking section for baking the liquid dough to form the baked dough around the spit;
conveyance means for conveying the spit between the dough supply section and the dough baking section;
at least one kind of forming tool including a forming surface conforming to a shape of at least a part of an outer shape of the spit; and
drive means for pressing the at least one kind of forming tool against the baked dough in the shape of the layer that is formed around the spit.

2. The production device for layered food according to claim 1, further comprising rotation control means for rotating the spit,
wherein the at least one kind of forming tool is pressed against the baked dough under a state in which the baked dough is directed in a predetermined direction through rotation of the spit by a predetermined angle.

3. The production device for layered food according to claim 1, wherein the dough baking section comprises a water storage container for storing water, and is configured to evaporate and scatter the water in the water storage container to the dough baking section by using heat generated during baking.

4. The production device for layered food according to claim 3, wherein the water storage container has an opened upper surface, and is arranged at a position below the spit with the liquid dough being baked.

5. The production device for layered food according to claim 1,
wherein the dough supply section comprises:
a dough tray for storing the liquid dough; and
raising and lowering means for raising and lowering the dough tray in an up-down direction, and wherein the liquid dough is caused to adhere to the outer circumference of the spit by raising the dough tray and rotating the spit under a state in which the spit is soaked in the liquid dough.

6. The production device for layered food according to claim 1, further comprising a shutter for opening and closing a communication passage between the dough supply section and the dough baking section, wherein the shutter is made of a heat insulating material.

7. The production device for layered food according to claim 1, wherein the dough baking section comprises a plurality of baking regions capable of baking the liquid dough, and wherein the spit is delivered to the dough supply section after being successively conveyed to the plurality of baking regions in the dough baking section by the conveyance means.

8. A production method for layered food to be produced by laminating a plurality of pieces of baked dough in a shape of a layer so as to surround an inner hole, the production method comprising:

a coating step of causing liquid dough to adhere to an outer circumference of a spit;

a baking step of baking the liquid dough to form the baked dough around the spit; and a forming step of forming an outer shape of the baked dough so that the outer shape of the baked dough conforms to an outer shape of the spit by pressing at least one kind of forming tool, including a forming surface conforming to a shape of at least a part of the outer shape of the spit, against the baked dough in the shape of the layer that is formed around the spit.

9. The production method for layered food according to claim 8, wherein the at least one kind of forming tool is pressed against the baked dough while changing a direction of the baked dough through rotation of the spit by a predetermined angle.

10. The production method for layered food according to claim 8, wherein the forming step is performed after the coating step and the baking step is performed repeatedly a plurality of times.

11. The production method for layered food according to claim 8, wherein the baking step comprises baking the liquid dough while evaporating and scattering water stored in a water storage container by using heat generated during baking.

12. The production method for layered food according to claim 11, wherein the water storage container has an opened upper surface, and is arranged at a position below the spit with the liquid dough being baked.

* * * * *